US012191563B2

(12) United States Patent
Kim

(10) Patent No.: US 12,191,563 B2
(45) Date of Patent: Jan. 7, 2025

(54) ELECTRONIC DEVICE AND METHOD FOR IMPROVING PERFORMANCE OF ANTENNA OF ELECTRONIC DEVICE

(71) Applicant: Samsung Electronics Co., Ltd., Suwon-si (KR)

(72) Inventor: Hyungkeun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 17/687,117

(22) Filed: Mar. 4, 2022

(65) Prior Publication Data

US 2022/0302583 A1 Sep. 22, 2022

Related U.S. Application Data

(63) Continuation of application No. PCT/KR2022/002711, filed on Feb. 24, 2022.

(30) Foreign Application Priority Data

Mar. 16, 2021 (KR) ........................ 10-2021-0034019

(51) Int. Cl.
*H01Q 1/48* (2006.01)

(52) U.S. Cl.
CPC .................................... *H01Q 1/48* (2013.01)

(58) Field of Classification Search
CPC .......... G04G 21/04; H01Q 1/24; H01Q 1/243; H01Q 1/273; H01Q 1/38; H01Q 1/46; H01Q 1/48; H01Q 5/328; H01Q 7/00
See application file for complete search history.

(56) References Cited

U.S. PATENT DOCUMENTS

| | | | |
|---|---|---|---|
| 9,709,960 | B2 | 7/2017 | Cho et al. |
| 10,153,554 | B2 | 12/2018 | Martinis et al. |

(Continued)

FOREIGN PATENT DOCUMENTS

| | | | |
|---|---|---|---|
| CN | 110350294 | A | 10/2019 |
| JP | 6593202 | B2 | 10/2019 |

(Continued)

OTHER PUBLICATIONS

International Search Report dated Jun. 7, 2022, issued in International Application No. PCT/KR2022/002711.

(Continued)

*Primary Examiner* — Thien M Le
(74) *Attorney, Agent, or Firm* — Jefferson IP Law, LLP

(57) ABSTRACT

An electronic device is provided. The electronic device may include a feeding unit configured to be provided with a feeding signal from a communication circuit of the electronic device, an antenna electrically connected to the feeding unit, a first electronic component disposed in the electronic device, a first mounting unit positioned in a first direction of the feeding unit and including a portion of the first electronic component, disposed near the antenna, a ground configured to provide a reference potential to the feeding unit, a first ground terminal and a second ground terminal, positioned on the first electronic component and included in a circuit configured to electrically connect the ground to the first electronic component, a first bead positioned between the second ground terminal and the first mounting unit, a first switch positioned at a side of the ground to electrically connect the ground to the first ground terminal or electrically connect the ground to the second ground terminal, and at least one processor configured to control an operation of the first switch.

19 Claims, 15 Drawing Sheets

(56) References Cited

U.S. PATENT DOCUMENTS

| | | | | |
|---|---|---|---|---|
| 10,312,571 | B2 | 6/2019 | Edwards et al. | |
| 10,581,169 | B2 | 3/2020 | Kim et al. | |
| 10,607,785 | B2 | 3/2020 | Aizawa et al. | |
| 10,608,329 | B2 | 3/2020 | Jung et al. | |
| 10,871,751 | B2 | 12/2020 | Yun et al. | |
| 10,879,597 | B2 | 12/2020 | Kang et al. | |
| 10,903,552 | B2 | 1/2021 | Jeon | |
| 11,095,021 | B2 | 8/2021 | Sung et al. | |
| 2010/0013723 | A1* | 1/2010 | Platt | H01Q 1/34 343/709 |
| 2013/0223659 | A1* | 8/2013 | Zhen | H04R 5/04 381/309 |
| 2015/0214623 | A1* | 7/2015 | Han | H01Q 1/48 343/846 |
| 2017/0244818 | A1 | 8/2017 | Kim et al. | |
| 2018/0010990 | A1* | 1/2018 | Cherubini | B01L 3/5021 |
| 2018/0027343 | A1* | 1/2018 | Dobson | H04R 25/556 381/322 |
| 2018/0129170 | A1 | 5/2018 | Yun et al. | |
| 2018/0342794 | A1 | 11/2018 | Han et al. | |
| 2019/0078958 | A1* | 3/2019 | Kanamori | G01L 23/22 |
| 2019/0215794 | A1 | 7/2019 | Sayem et al. | |
| 2020/0015701 | A1* | 1/2020 | Wei | A61B 5/002 |
| 2020/0091588 | A1 | 3/2020 | Zhao et al. | |
| 2020/0412001 | A1 | 12/2020 | Ayala Vazquez et al. | |
| 2021/0378289 | A1* | 12/2021 | Cieslikowski | A24C 5/01 |
| 2022/0302583 | A1* | 9/2022 | Kim | H01Q 1/243 |
| 2022/0311127 | A1 | 9/2022 | Li et al. | |
| 2023/0421683 | A1* | 12/2023 | McGuire | H04N 23/57 |
| 2024/0035087 | A1* | 2/2024 | Langford | B01L 3/502707 |

FOREIGN PATENT DOCUMENTS

| | | | |
|---|---|---|---|
| KR | 10-2016-0080473 | A | 7/2016 |
| KR | 10-2018-0024336 | A | 3/2018 |
| KR | 10-2018-0050151 | A | 5/2018 |
| KR | 10-2019-0022074 | A | 3/2019 |
| KR | 10-2019-0024015 | A | 3/2019 |
| KR | 10-2019-0024151 | A | 3/2019 |
| KR | 10-2021-0015460 | A | 2/2021 |
| WO | 2020/228728 | A1 | 11/2020 |

OTHER PUBLICATIONS

Extended European Search Report dated Jun. 13, 2024, issued in European Application No. 22771633.9-1201.

* cited by examiner

| 322 | 321 | NOTE |
|---|---|---|
| Short | Open | (7시 Short only) |
| Open | Short | (3시 Short only) |
| Short | Short | (7시+3시 Short) |
| Open | Open | (Open) |

ELECTRONIC DEVICE AND METHOD FOR IMPROVING PERFORMANCE OF ANTENNA OF ELECTRONIC DEVICE

CROSS-REFERENCE TO RELATED APPLICATION(S)

This application is a continuation application, claiming priority under § 365(c), of an International application No. PCT/KR2022/002711, filed on Feb. 24, 2022, which is based on and claims the benefit of a Korean patent application number 10-2021-0034019, filed on Mar. 16, 2021, in the Korean Intellectual Property Office, the disclosure of which is incorporated by reference herein in its entirety.

TECHNICAL FIELD

The disclosure relates to an electronic device. More particularly, the disclosure relates to an electronic device including an antenna and a method for improving antenna performance of an electronic device.

BACKGROUND ART

An electronic device may have a front metal housing used to form a loop structure of an antenna that supports frequency bands of 3rd generation (3G), long term evolution (LTE), 5th generation (5G), and/or global positioning system (GPS). A front metal loop antenna may include a metal housing, a feeding unit, and/or a short pin. The feeding unit and the short pin may be connected through a c-clip, and may be directly connected to the metal housing through a metal pad.

For example, the electronic device may apply a path to the feeding unit such at an RF signal can move, and may apply a ground to the short pin. In this case, a loop may be formed between the feeding unit and the short pin. The band frequency of the antenna may vary depending on the loop structure formed inside the antenna. A changed position of the short pin may vary the loop structure. In this case, the band frequency of the antenna may also vary. Eventually, the position of the short pin may be controlled to control the band frequency of the antenna.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device which is lightweight, flat, short, and compact has a limited internal disposition space, which may make installation of an additional short pin difficult. Without an additional short pin, it may be difficult to variously form the antenna band frequency. In this case, the band frequency supported by the electronic device may be restricted.

Addition of a short pin may require an increased antenna size, and this may make it difficult to make the electronic device compact.

Aspects of the disclosure are to address at least the above-mentioned problems and/or disadvantages and to provide at least the advantages described below. Accordingly, an aspect of the disclosure is to provide an antenna supporting various band frequencies without an additional short pin.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a feeding unit configured to be provided with a feeding signal from a communication circuit of the electronic device, an antenna electrically connected to the feeding unit, a first electronic component disposed in the electronic device, a first mounting unit positioned in a first direction of the feeding unit and including a portion of the first electronic component, disposed near the antenna, a ground configured to provide a reference potential to the feeding unit, a first ground terminal and a second ground terminal, positioned on the first electronic component and included in a circuit configured to electrically connect the ground to the first electronic component, a first bead positioned between the second ground terminal and the first mounting unit, a first switch positioned at a side of the ground to electrically connect the ground to the first ground terminal or electrically connect the ground to the second ground terminal, and a processor configured to control an operation of the first switch. The processor may electrically connect the first switch to the first ground terminal to perform control such that the first mounting unit is electrically connected to the ground without going through the first bead, or electrically connect the first switch to the second ground terminal to perform control such that the first mounting unit is electrically connected to the ground through the first bead.

In accordance with another aspect of the disclosure, a method for improving performance of an antenna of an electronic device is provided. The method includes electrically connecting a first switch to a first ground terminal to perform control such that a first mounting unit is electrically connected to a ground without going through the bead, or electrically connecting the first switch to a second ground terminal to perform control such that the first mounting unit is electrically connected to the ground through the first bead.

Advantageous Effects of Invention

An electronic device and a method for improving antenna performance of an electronic device, according to the disclosure, may improve the antenna performance through an internal electronic component without an additional short pin.

According to various embodiments of the disclosure, antenna performance may be improved without an additional short pin, thereby making the antenna and the electronic device compact.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
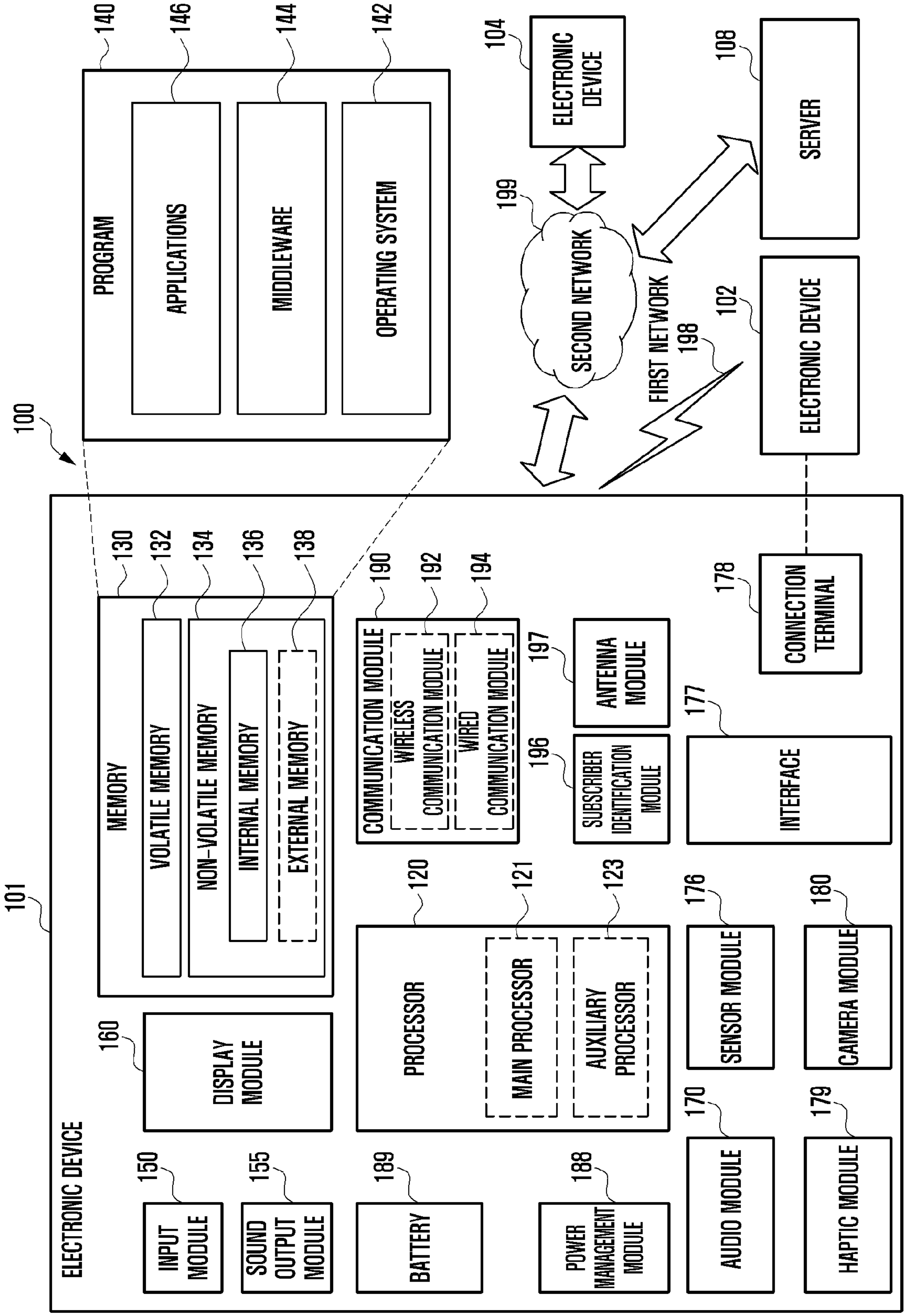
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
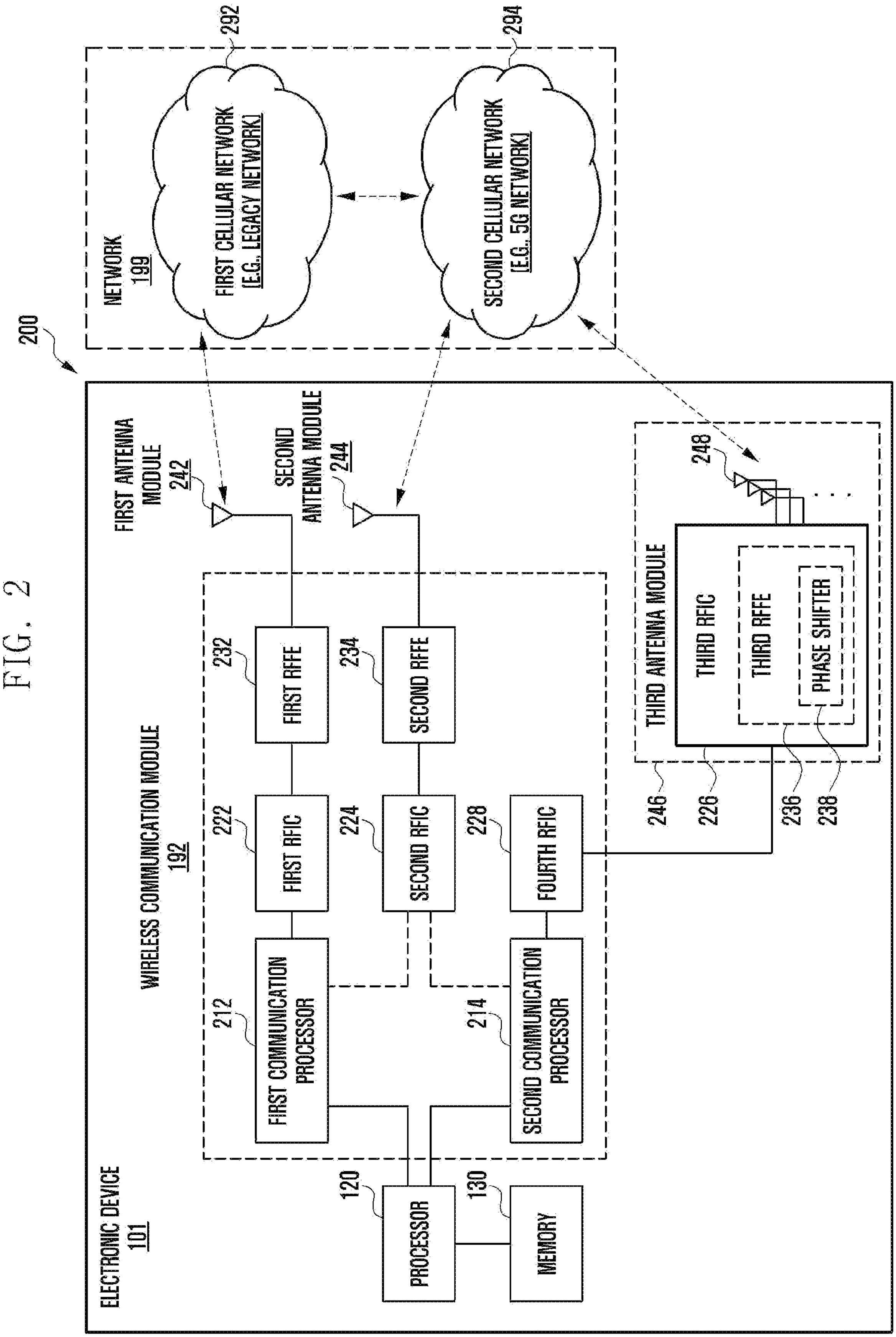
FIG. 2 is a block diagram of an electronic device for supporting legacy network communication and 5G network communication according to an embodiment of the disclosure.

FIG. 2 is a block diagram 200 of an electronic device for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first network 292 and a second network 294. According to another embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment of the disclosure, the fourth RFIC 228 may be omitted or may be included as a part of the third RFIC 226.

The first communication processor 212 may establish a communication channel for a band to be used for wireless communication with the first network 292, and may support legacy network communication through the established communication channel. According to various embodiments of the disclosure, the first network may be a legacy network including a 2nd generation (2G), 3G, 4G, or long-term-evolution (LTE) network. The second communication processor 214 may establish a communication channel corresponding to a band (e.g., from about 6 GHz to about 60 GHz) designated among bands to be used for wireless communication with the second network 294, and may support 5G network communication through the established communication channel. According to various embodiments of the disclosure, the second network 294 may be a 5G network defined in the 3$^{rd}$ generation partnership project (3GPP). Additionally, according to an embodiment of the disclosure, the first communication processor 212 or the second communication processor 214 may establish a communication channel corresponding to another designated band (e.g., about 6 GHz or less) among bands to be used for wireless communication with the second network 294, and may support 5G network communication through the established communication channel. According to an embodiment of the disclosure, the first communication processor 212 and the second communication processor 214 may be implemented in a single chip or a single package. According to various embodiments of the disclosure, the first communication processor 212 or the second communication processor 214 may be disposed in a single chip or a single package together with the processor 120, the auxiliary processor 123, or the communication module 190.

At the time of signal transmission, the first RFIC 222 may convert a baseband signal generated by the first communication processor 212 into a radio-frequency (RF) signal of about 700 MHz to about 3 GHz used for the first network 292 (e.g., a legacy network). At the time of signal reception, an RF signal may be acquired from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal that can be processed by the first communication processor 212.

At the time of signal transmission, the second RFIC 224 may convert a baseband signal generated by the first communication processor 212 or the second communication processor 214 into an RF signal (hereinafter, referred to as a "5G Sub6 RF signal") of a Sub6 band (e.g., about 6 GHz or less) used for the second network 294 (e.g., a 5G network). At the time of signal reception, a 5G Sub6 RF signal may be acquired from the second network 294 (e.g., a 5G network) through an antenna (e.g., the second antenna module 244), and may be preprocessed through an RFFE (e.g., the second RFFE 234). The second RFIC 224 may convert the preprocessed 5G Sub6 RF signal into a baseband signal that can be processed by a corresponding communication processor among the first communication processor 212 or the second communication processor 214.

The third RFIC 226 may convert a baseband signal generated by the second communication processor 214 into an RF signal (hereinafter, referred to as a "5G Above6 RF signal") of a 5G Above6 band (e.g., from about 6 GHz to about 60 GHz) to be used in the second network 294 (e.g., a 5G network). At the time of signal reception, a 5G Above6 RF signal may be acquired from the second network 294 (e.g., a 5G network) through an antenna (e.g., the antenna 248), and may be preprocessed through the third RFFE 236. The third RFIC 226 may convert the preprocessed 5G Above6 RF signal into a baseband signal that can be processed by the second communication processor 214. According to an embodiment of the disclosure, the third RFFE 236 may be formed as a part of the third RFIC 226.

According to an embodiment of the disclosure, the electronic device 101 may include the fourth RFIC 228 separately from the third RFIC 226 or as at least a part thereof. The fourth RFIC 228 may convert a baseband signal generated by the second communication processor 214 into an RF signal of an intermediate frequency band (e.g., from about 9 GHz to about 11 GHz) (hereinafter, referred to as an "IF signal"), and may then transmit the IF signal to the third RFIC 226. The third RFIC 226 may convert the IF signal into a 5G Above6 RF signal. At the time of signal reception, a 5G Above6 RF signal may be received from the second network 294 (e.g., a 5G network) through an antenna (e.g., the antenna 248), and may be converted into an IF signal by the third RFIC 226. The fourth RFIC 228 may convert the IF signal into a baseband signal that can be processed by the second communication processor 2.

According to an embodiment of the disclosure, the first RFIC 222 and the second RFIC 224 may be implemented as at least a part of a single package or a single chip. According to an embodiment of the disclosure, the first RFFE 232 and the second RFFE 234 may be implemented as at least a part of a single package or a single chip. According to an embodiment of the disclosure, at least one antenna module among the first antenna module 242 or the second antenna module 244 may be omitted, or may be combined with the other antenna module to process RF signals of multiple bands corresponding thereto.

According to an embodiment of the disclosure, the third RFIC 226 and the antenna 248 may be arranged on the same substrate to form a third antenna module 246. For example, the wireless communication module 192 or the processor 120 may be disposed on a first substrate (e.g., a main PCB). In this case, the third antenna module 246 may be formed by disposing the third RFIC 226 in a partial region (e.g., a lower surface) of a second substrate (e.g., a sub PCB) different from the first substrate and disposing the antenna 248 in another partial region (e.g., an upper surface) of the second substrate. Disposing the third RFIC 226 and the antenna 248 on the same substrate can reduce the length of a transmission line therebetween. This can reduce, for example, the loss (e.g., attenuation) of a signal due to a transmission line in a high-frequency band (e.g., from about 6 GHz to about 60 GHz) used for 5G network communication. Therefore, the electronic device 101 can enhance the quality or speed of communication with the second network 294 (e.g., a 5G network).

According to an embodiment of the disclosure, the antenna 248 may be formed as an antenna array including multiple antenna elements which can be used for beamforming. In this case, for example, the third RFIC 226 may include, as a part of the third RFFE 236, multiple phase shifters 238 corresponding to the multiple antenna elements. At the time of signal transmission, each of the multiple phase shifters 238 may shift the phase of a 5G Above6 RF signal to be transmitted from the electronic device 101 to the outside (e.g., a base station of a 5G network) through a corresponding antenna element. At the time of signal reception, each of the multiple phase shifters 238 may shift the phase of a 5G Above6 RF signal received from the outside through a corresponding antenna element into an identical or substantially identical phase. This enables transmission or reception through beamforming between the electronic device 101 and the outside.

The second network 294 (e.g., a 5G network) may be operated independently of the first network 292 (e.g., a legacy network) (e.g., standalone (SA)) or may be operated while being connected to the first network (e.g., non-standalone (NSA)). For example, the 5G network may include only an access network (e.g., a 5G radio access network (RAN) or a next-generation RAN (NG RAN)), and may not include a core network (e.g., a next-generation core (NGC) network). In this case, the electronic device 101 may access the access network of the 5G network and may then access an external network (e.g., the Internet) under the control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
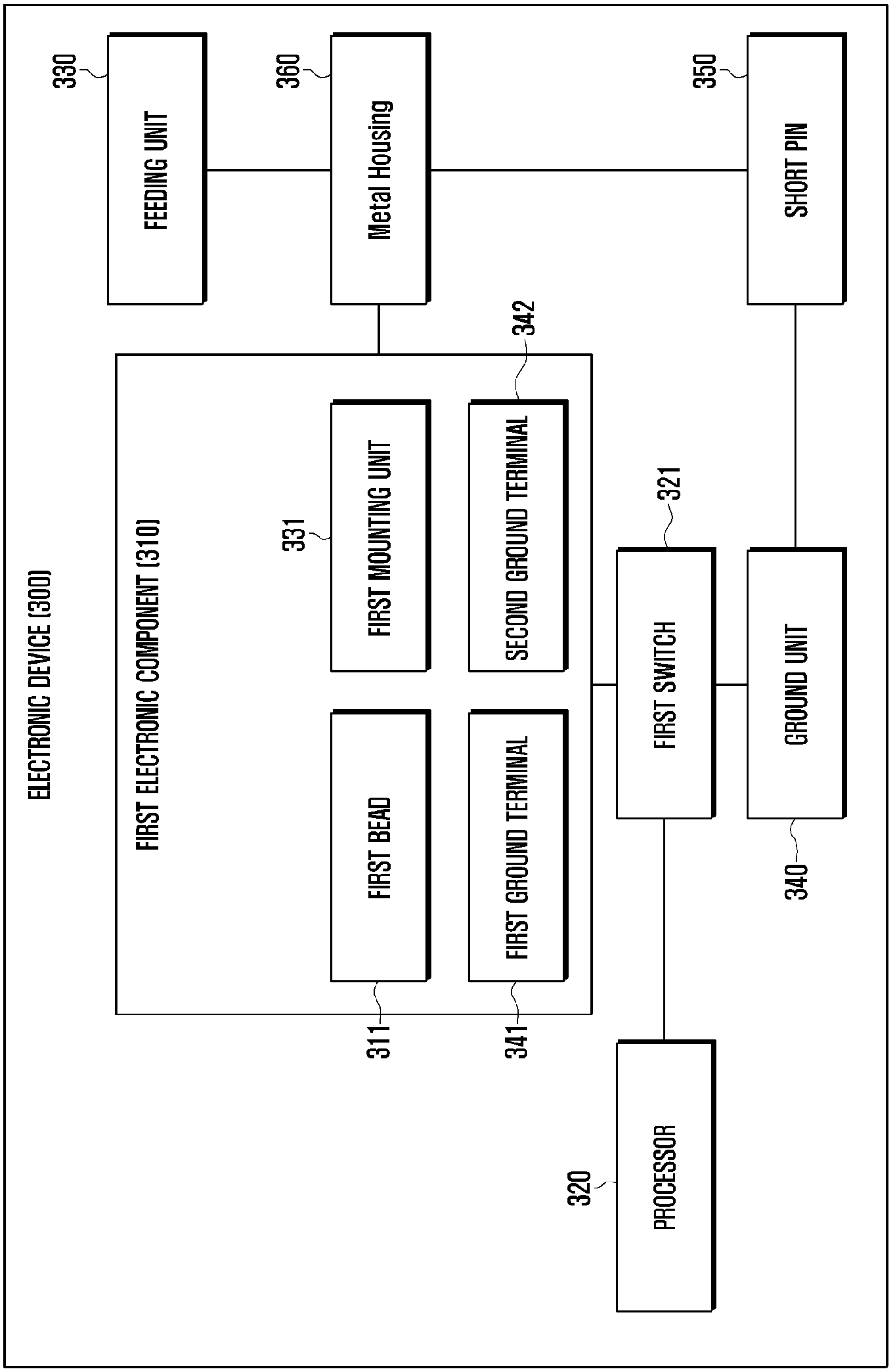
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, according to various embodiments of the disclosure, an electronic device 300 may include a first electronic component 310, a processor 320, a feeding unit 330, a ground 340, and a short pin 350. The first electronic component 310 may include a first bead 311, a first mounting unit 331, a first ground terminal 341, and a second ground terminal 342. According to various embodiments of the disclosure, the first electronic component 310 may include the first bead 311, a first switch 321, the first mounting unit 331, the first ground terminal 341, and the second ground terminal 342.

According to various embodiments of the disclosure, the first electronic component 310 may be disposed in a front metal antenna of the electronic device 300. The first electronic component 310 may include at least one of a barometer, an electrocardiogram (ECG)/Back key, a microphone (MIC), a power key, a speaker, or a universal bus (UB) flexible printed circuit board (FPCB). The first electronic component 310 may include any component which can be disposed on a FPCB of the front metal antenna, and is not limited to the above-described examples.

According to various embodiments of the disclosure, the electronic device 300 may include the processor 320. The processor 320 is an element capable of controlling each element of the electronic device 300 and/or performing data processing or calculation regarding communication, and may include one or more processors 320. The processor 320 may include at least some of the elements and/or functions of the processor 120 in FIG. 1.

According to various embodiments of the disclosure, calculation and data processing functions, which the processor 320 can implement in the electronic device 300, are not limited. However, hereinafter, a feature related to control of a switch device (e.g., the first switch 321 in FIG. 3) will be described below. Operations of the processor 320 may be performed by loading instructions stored in a memory (e.g., the memory 130 in FIG. 1).

According to various embodiments of the disclosure, the electronic device 300 may include the feeding unit 330. The feeding unit 330 may include a portion for supplying a current to an antenna. An RF signal circuit is generated to transmit an RF signal from a main board of the electronic device 300 to the feeding unit 330. Further, the main board may apply a ground to the short pin 350 to form a loop structure in the antenna together with the feeding unit 330. The ground 340 may include a ground, and the ground may provide a reference point of an operation of the first electronic component 310. The reference potential may be determined based on a main printed circuit board (PCB). The ground 340 may provide the reference potential to the feeding unit 330, the first electronic component 310, and the short pin 350. The feeding unit 330 may transmit an RF signal and a current toward the first mounting unit 331 disposed in the front metal antenna.

According to various embodiments of the disclosure, the first mounting unit 331 may include a portion of the first electronic component 310, disposed nearby. The first ground terminal 341 and the second ground terminal 342 may be placed on the first electronic component 310, and may include portions for connecting the ground 340 to the first electronic component 310. The first switch 321 may be positioned at a side of the ground 340 to connect the ground 340 to the first ground terminal 341 or connect the ground 340 to the second ground terminal 342. The processor 320 may control an operation of the first switch 321.

According to various embodiments of the disclosure, the electronic device 300 may include the first bead 311. The first bead 311 may function as an inductor or a filter in the electronic device 300. When an RF signal and a current flowing on a circuit pass through the first bead 311, the RF signal of a high-frequency band may be blocked. However, the first bead 311 may not have an effect on the operation of the first electronic component 310 by allowing a current used for an operation of the first electronic component 310 to pass therethrough. For example, the first bead 311 may play the role of blocking an RF signal of the antenna.

According to various embodiments of the disclosure, the loop structure of the antenna may vary depending on the position of the first electronic component 310 with reference to the feeding unit 330. The loop structure may determine the structure, length, and resonance frequency of the antenna.

According to various embodiments of the disclosure, the processor 320 may connect the first switch 321 to the first ground terminal 341 to perform control such that the first mounting unit 331 is connected to the ground 340 without going through the first bead 311. Further, the processor 320 may connect the first switch 321 to the second ground terminal 342 to perform control such that the first mounting unit 331 is connected to the ground 340 through the first bead 311.

Figure 4:
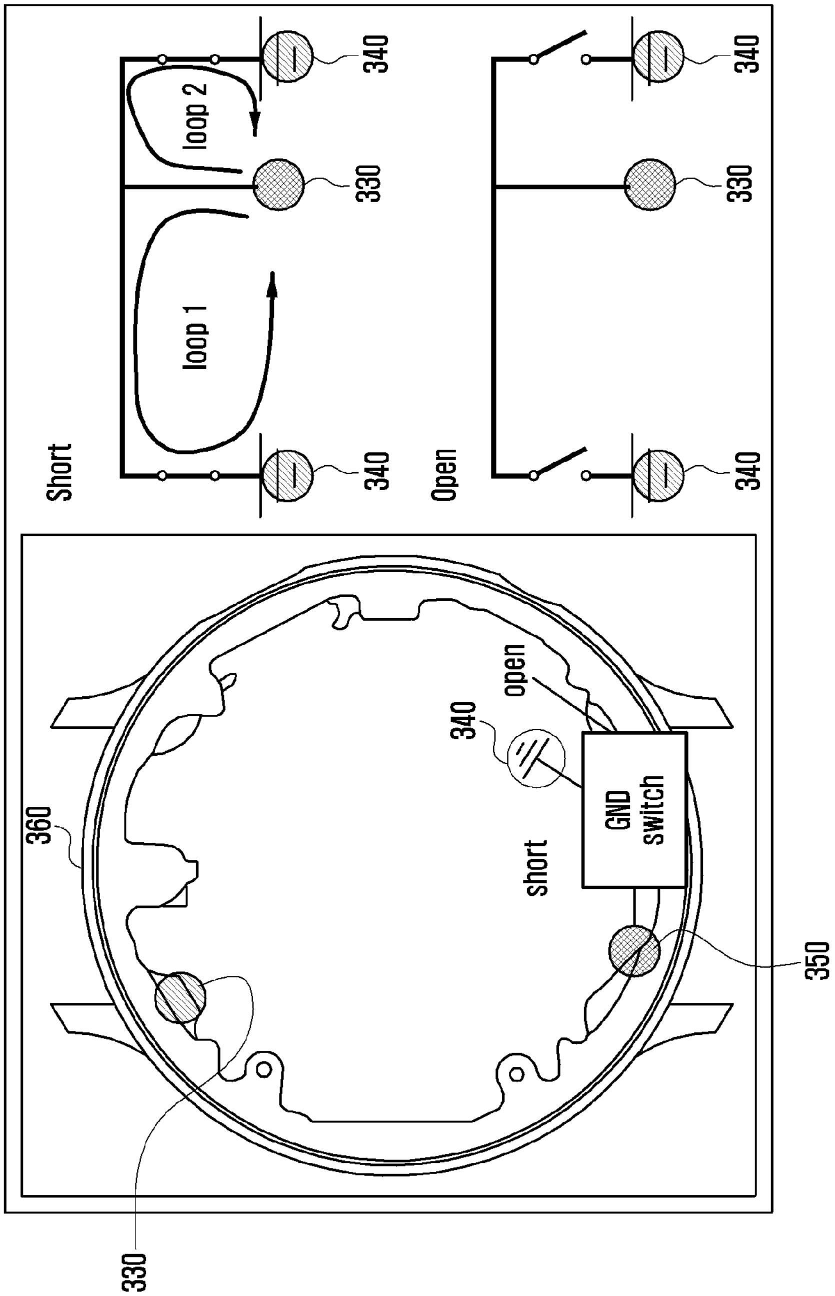
FIG. 4 illustrates a structure of an antenna of an electronic device according to an embodiment of the disclosure.

FIG. 4 illustrates a structure of an antenna of an electronic device according to an embodiment of the disclosure.

Referring to FIG. 4, it may be identified that a loop is formed between the feeding unit 330 and the short pin 350. When the length of the formed loop increases, the length of an antenna may increase and relatively the band (frequency band) of the antenna may decrease. When the length of the formed loop decreases, the length of the antenna may decrease and relatively the band of the antenna may increase. In FIG. 4, it may be identified that loop 1 is relatively long compared with loop 2. The relatively long loop 1 may be used as a low band antenna, and the relatively short loop 2 may be used as a high band antenna. A low band and a high band may imply a relative frequency range.

According to various embodiments of the disclosure, a main board disposed in a metal housing 360 of the antenna may apply a path for passage of an RF signal to the feeding unit 330, and may apply a ground to the short pin 350. According to an embodiment of the disclosure, a switch may be positioned between the short pin 350 and the ground 340, and the switch may be in an electrically shorted state. Thus, the antenna may form a loop structure. The antenna may radiate an RF signal through the loop structure. The loop structure may be differently formed depending on the position of the short pin 350, and various loop structures may be formed by changing the arrangement position and the number of short pins 350 in the antenna. Thus, the antenna may have various lengths, and the radiation performance of the antenna for each band may be improved by adjusting the length of the antenna for each band. For example, a first antenna (e.g., loop 1) for transmitting and receiving an RF signal of a relatively low band may include an antenna having a first length. A second antenna (e.g., loop 2) for transmitting and receiving an RF signal of a relatively high band may include an antenna having a second length. According to an embodiment of the disclosure, the length of the antenna may be determined based on a frequency band (e.g., a high band or a low Band), and the first length of the first antenna taking charge of the low band may have a greater value than the second length of the second antenna taking charge of the high band. Further, the performance of the antenna may be maximized for each frequency band by adjusting the length of the antenna. The adjustment of the length of the antenna according to loop formation will be described below in FIG. 9.

Figure 5:
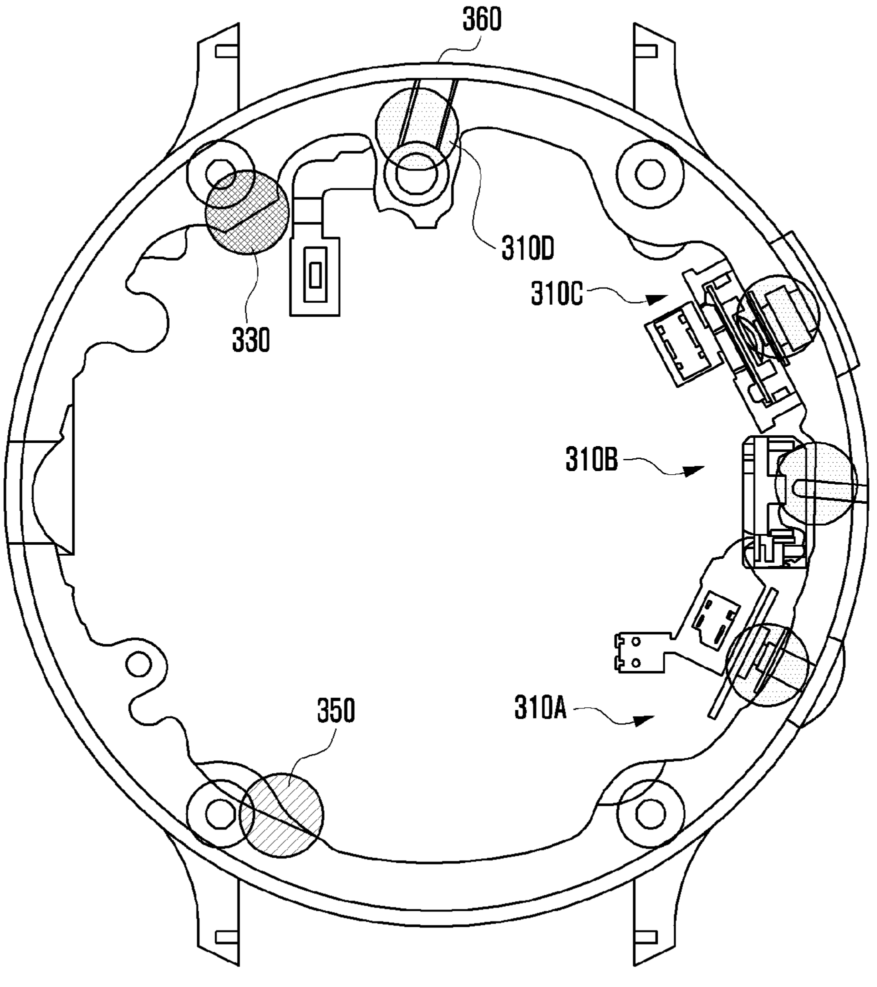
FIG. 5 illustrates electronic components disposed in an antenna of an electronic device according to an embodiment of the disclosure.

FIG. 5 illustrates electronic components disposed in an antenna of an electronic device according to an embodiment of the disclosure.

Referring to FIG. 5, according to various embodiments of the disclosure, the electronic device 300 may dispose one or more electronic components (e.g., 310A to 310D) in an antenna for operation. The first electronic component 310 may include the electronic components (e.g., 310A to 310D), and may include at least one of, for example, a barometer, an ECG/Back key, a MIC, a power key, a speaker, or a UB FPCB.

According to various embodiments of the disclosure, the length of the antenna may be adjusted through arrangement of a short pin 350. Further, short pins 350 connected according to bands may be adjusted or used together through a switch. In this case, the resonance shift width of the antenna may be variously formed by arranging multiple short pins 350 rather than using a single short pin 350. When the resonance shift width of the antenna is variously formed, the performance of the antenna may be improved for each band.

Due to limitation of an arrangement space in the light-weight, thin, short, and small electronic device 300, it may be difficult to additionally dispose the short pin 350 in a desired position. According to FIG. 5, it may be identified that multiple electronic components (e.g., 310A to 310D) occupy the inner arrangement space of the antenna. According to an embodiment of the disclosure, the first electronic component 310 may include at least one electronic component among a MIC, a speaker, a key button, a UB FPCB, a power key, and an ECG/back key. For example, the first electronic component 310 may include the MIC. The MIC has a unique function (e.g., a function of amplifying a voice signal), and thus it may be difficult to remove the MIC and dispose the short pin 350. This may be true for other electronic components, including the speaker. As a result, it may be difficult to replace the first electronic component 310 with the short pin 350.

In order to overcome the difficulties, in the electronic device 300 according to various embodiments of the disclosure, the first electronic component 310 may be directly connected or coupled to the antenna and used as the short pin 350. For example, the electronic device 300 may use the first electronic component 310 to operate the antenna like a multi-short pin 350 structure without further installing the short pin 350. It has been described above that the multi-short pin 350 structure may increase the resonance shift width of the antenna, and thus may have an effect of improving frequency performance in a specific band.

In the multi-short pin 350 structure using multiple short pins 350, the processor 320 may freely control open/short conditions through the switch. However, when the first electronic component 310 is used as the short pin 350, the first electronic component 310 may be continuously in a shorted state or an open state. Therefore, it may be difficult to form the multi-short pin 350 structure of the antenna by using the first electronic component 310.

Figure 6:
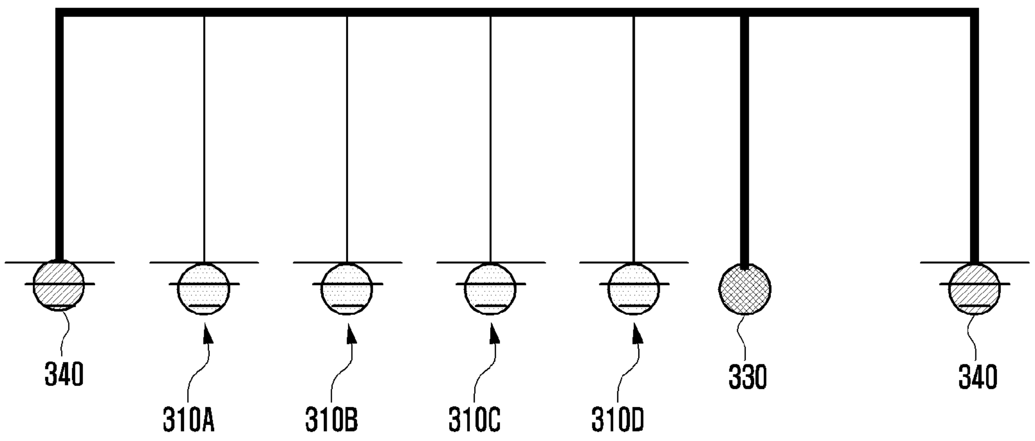
FIG. 6 schematizes a situation in which multiple electronic components are disposed in an electronic device in FIG. 5 according to an embodiment of the disclosure.

FIG. 6 schematizes a situation in which multiple electronic components are disposed in an electronic device in FIG. 5 according to an embodiment of the disclosure.

As described above in relation to FIG. 5, in FIG. 6, it may be identified that the first electronic component 310 is continuously in a shorted state.

Referring to FIG. 6, according to an embodiment of the disclosure, the feeding unit 330 may include an electrically shorted state when a neighboring electronic component 310C or 310D is used to form a loop. In this case, the loop may be mainly formed between the feeding unit 330 and some electronic components 310C or 310D, and it may be difficult to use the remaining short pin 350 or the other electronic components 310A or 310B. According to an embodiment of the disclosure, the other electronic components 310A or 310B may include capacitor characteristics between a connection point and the ground 340. This may imply that the other electronic components is coupled and connected to the feeding unit 330 and not directly connected to the feeding unit 330.

According to an embodiment of the disclosure, the first electronic component 310, like the short pin 350, may function as the ground 340 to form a loop with the feeding unit 330. In this case, it may be difficult that the loop is formed between the feeding unit 330 and the short pin 350. For example, the first electronic component 310 may be an obstacle to forming a loop through the feeding unit 330 and the short pin 350 in an antenna.

According to an embodiment of the disclosure, the first electronic component 310 cannot itself perform open/short control, and thus it may be difficult to change a loop structure in the antenna. In this regard, it may be difficult for the antenna to perform resonance shifting. For example, the first electronic component 310 cannot perform control unlike a switch, and thus it may be difficult for the first electronic component 310 to be used together with the short pin 350 or as the short pin 350.

Figure 7:
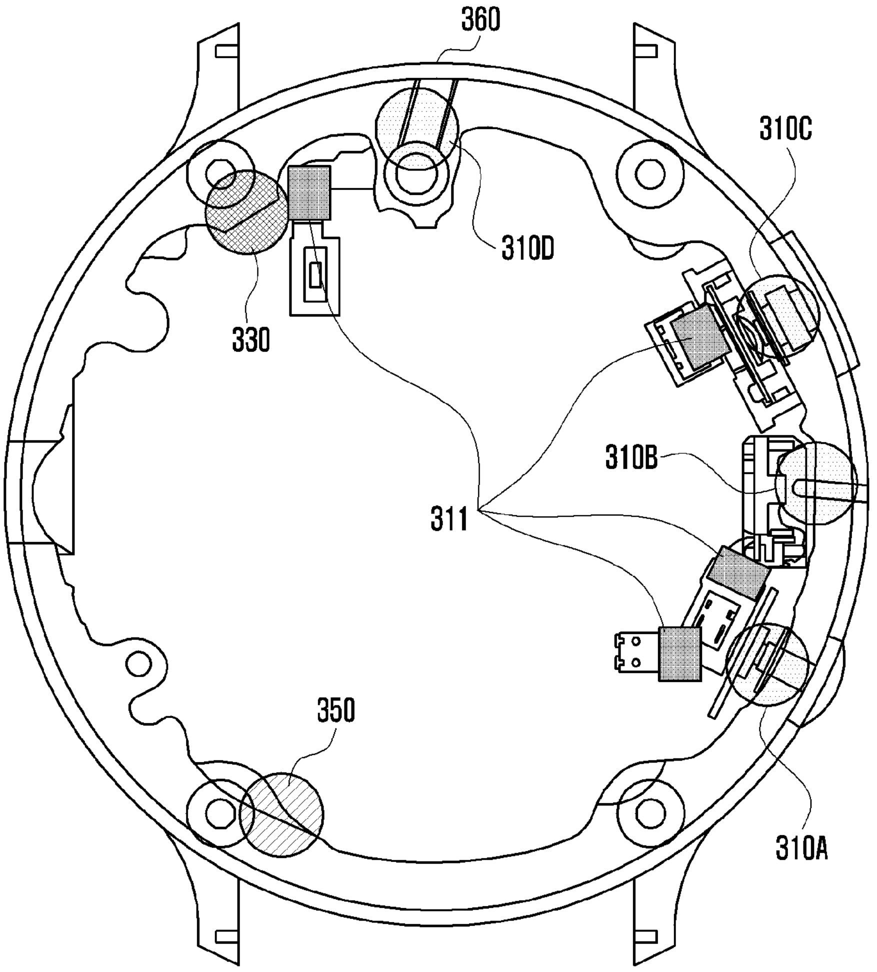
FIG. 7 illustrates an inner structure of an electronic device in which a bead is installed in FIG. 5 according to an embodiment of the disclosure.

FIG. 7 illustrates an inner structure of an electronic device in which a bead is further installed in FIG. 5 according to an embodiment of the disclosure.

Referring to FIGS. 5 and 7, it has been described why it is difficult to form the multi-short pin 350 structure of an antenna by using the first electronic component 310. In order to address the above-described issue, the first bead 311 (bead) may be installed in the first electronic component 310. The first bead 311 may function as an inductor or a filter in the electronic device 300. When an RF signal (e.g., a high band signal or a low band signal) and a current flowing on a circuit pass through the first bead 311, the RF signal of a high-frequency band may be blocked. However, the first bead 311 may not have an effect on an operation of the first electronic component 310 by allowing a current used for the operation of the first electronic component 310 to pass therethrough. For example, the first bead 311 may play the role of blocking an RF signal of the antenna. The first bead 311 may make the first electronic component 310 be in an open state in which an RF signal cannot pass therethrough.

However, even in this case, as in FIG. 5, it may be difficult for the processor 320 to freely control open/short conditions through a switch. For example, the first electronic component 310 may not vary in open and shorted states, but may be fixed in one condition (e.g., open or short). Due to this problem, it may be difficult to use the antenna in the multi-short pin 350 structure by using an electronic component.

Figure 8:
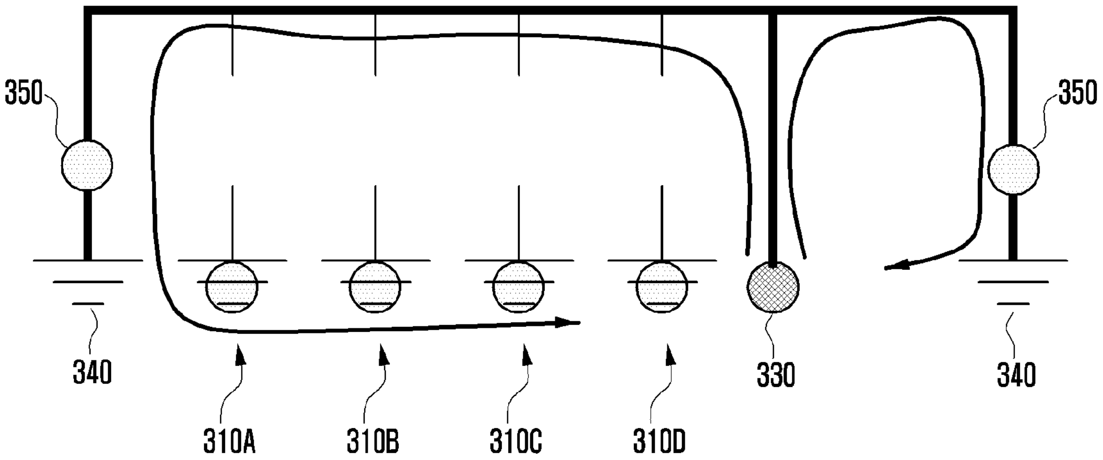
FIG. 8 schematizes a situation in which multiple electronic components and a bead are disposed in an electronic device in FIG. 7 according to an embodiment of the disclosure.

FIG. 8 schematizes a situation in which multiple electronic components and a bead are disposed in an electronic device in FIG. 7 according to an embodiment of the disclosure.

Referring to FIG. 7 above, in FIG. 8, it may be identified that the first electronic component 310 is continuously in an open state. In this case, the first electronic component 310 may not be an obstacle to forming a loop through the short pin 350. However, when the first electronic component 310 in the open state is used, it may be difficult to form a loop of an antenna having a different band (frequency band). For example, as described in FIG. 6 above, it may be difficult for the first electronic component 310 to perform open/short control, and it may not be possible to change a loop structure by using the first electronic component 310, whereby it may be difficult for the antenna to perform resonance shifting. As a result, the antenna has no choice but to form a loop by using the short pin 350, and due to a limitation of the inner arrangement space, it may be difficult to freely install the short pin 350. Ultimately, the antenna may not variously form a loop, and it may be difficult to apply an optimal frequency capable of improving performance in each band.

Figure 9:
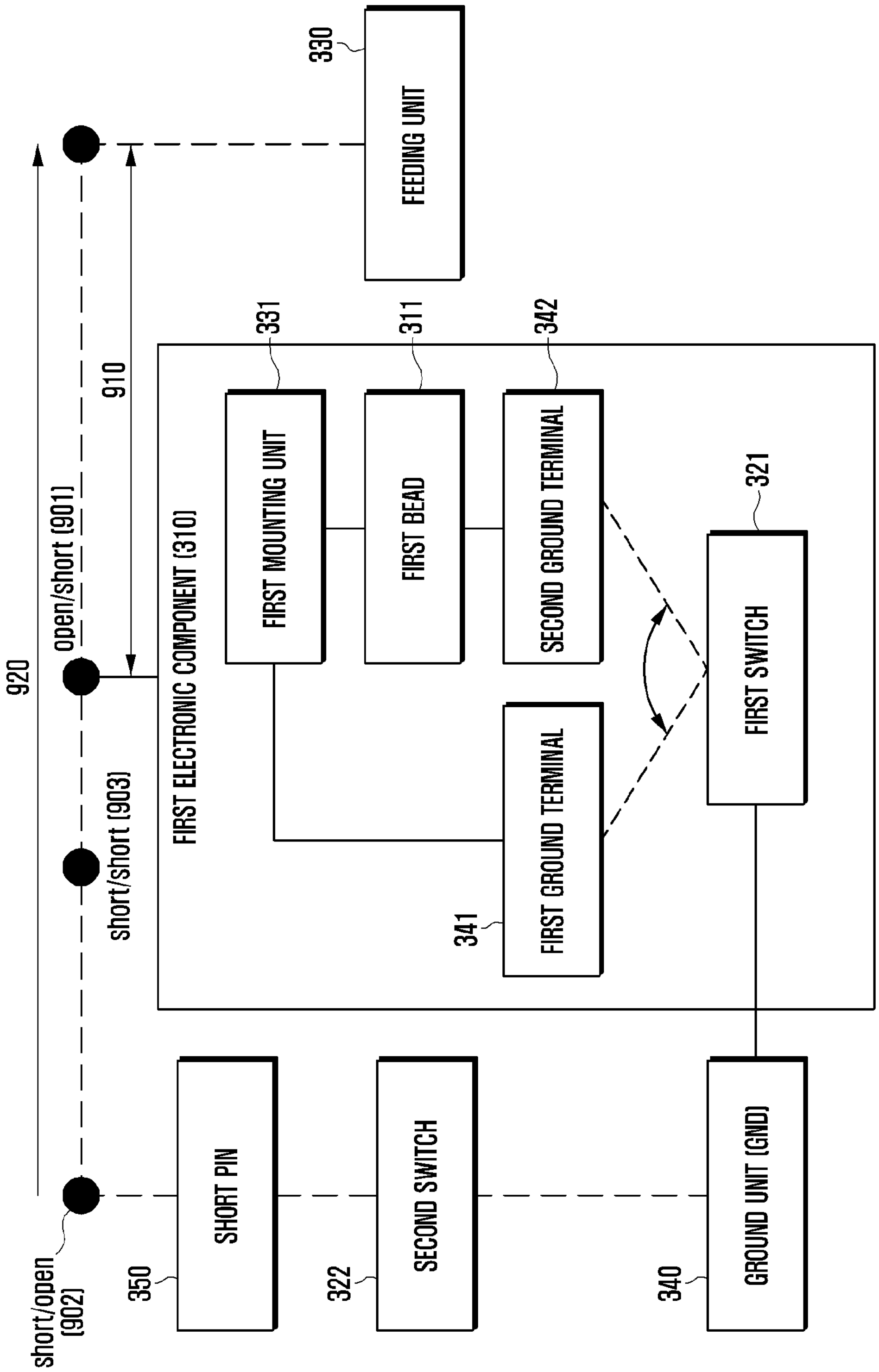
FIG. 9 illustrates a block diagram of a multi-short pin structure of an electronic device according to an embodiment of the disclosure.

FIG. 9 illustrates a block diagram of a multi-short pin structure of an electronic device according to an embodiment of the disclosure.

Referring to FIG. 9, according to various embodiments of the disclosure, the electronic device 300 may include a first electronic component 310, a feeding unit 330, a short pin 350, and a second switch 322 for connecting the short pin 350 to the feeding unit 330. The first electronic component 310 may include a first mounting unit 331, a first bead 311, a first ground terminal 341, a second ground terminal 342, and a first switch 321. Each of the elements has been described in FIG. 4.

FIG. 9 illustrates a process of arranging the elements in FIG. 4 and changing an element connected to the feeding unit 330, depending on operations of the first switch 321 and the second switch 322. For example, the first electronic component 310 may be connected, in a shorted state, to the feeding unit 330 depending on an operation of the first switch 321. Alternatively, the short pin 350 may be connected, in a shorted state, to the feeding unit 330 depending on an operation of the second switch 322. Alternatively, both the first electronic component 310 and the short pin 350 may be connected, in a shorted state, to the feeding unit 330 depending on operations of the first switch 321 and the second switch 322.

According to various embodiments of the disclosure, points 901, 902, and 903 connected to the feeding unit 330 is made may vary depending on operations of the first switch 321 and the second switch 322. The processor 320 may control the first switch 321 and the second switch 322, thereby determining a point 901, 902, or 903 connected to the feeding unit 330. Hereinafter, a description will be made assuming that the number of short pins 350 is one and the number of electronic component is one, but the disclosure is not limited thereto. The number of short pins 350 and the number of electronic components may be further increased, and accordingly the number of points connected to the feeding unit 330 may be increased.

According to various embodiments of the disclosure, when the second switch for connecting the short pin 350 to the feeding unit 330 may be shorted, and when the first switch 321 of the first electronic component 310 is connected to the second ground terminal 342, a loop may be formed at a point 902. When the second switch for connecting the short pin 350 to the feeding unit 330 is opened, and when the first switch 321 of the first electronic component 310 is connected to the first ground terminal 341, a loop may be formed at a point 901. When the second switch for connecting the short pin 350 to the feeding unit 330 is shorted, and when the first switch 321 of the first electronic component 310 is connected to the first ground terminal 341, a loop may be formed at a point 903. The length of an antenna may be determined based on the distance between the feeding unit 330 and a point at which a loop is formed. The resonance frequency of the antenna may be determined based on the length of the antenna. For example, when a point connected to the feeding unit 330 corresponds to the point 902, the length of the antenna may be proportional to a length 920 between the feeding unit 330 and the point 902. Similarly, when a point connected to the feeding unit 330 corresponds to the point 901, the length of the antenna may be proportional to a length 910 between the feeding unit 330 and the point 901.

According to various embodiments of the disclosure, the first switch 321 may connect the ground 340 to the first ground terminal 341, or may connect the ground 340 to the second ground terminal 342. The processor 320 may control an operation of the first switch 321 to determine a ground terminal connected to the ground 340. When the first switch 321 is connected to the first ground terminal 341 or the second ground terminal 342, the first mounting unit 331 may be connected to the ground 340. A structure in which a current or a signal flows from the feeding unit 330 to the ground 340 through the first mounting unit 331, and the structure of the first switch 321 will be described below in FIGS. 12 and 13.

According to various embodiments of the disclosure, the second switch 322 may be positioned between the short pin 350 and the feeding unit 330. The processor 320 may control the short pin 350 and the feeding unit 330 to be connected to each other through the second switch 322.

Figure 10:
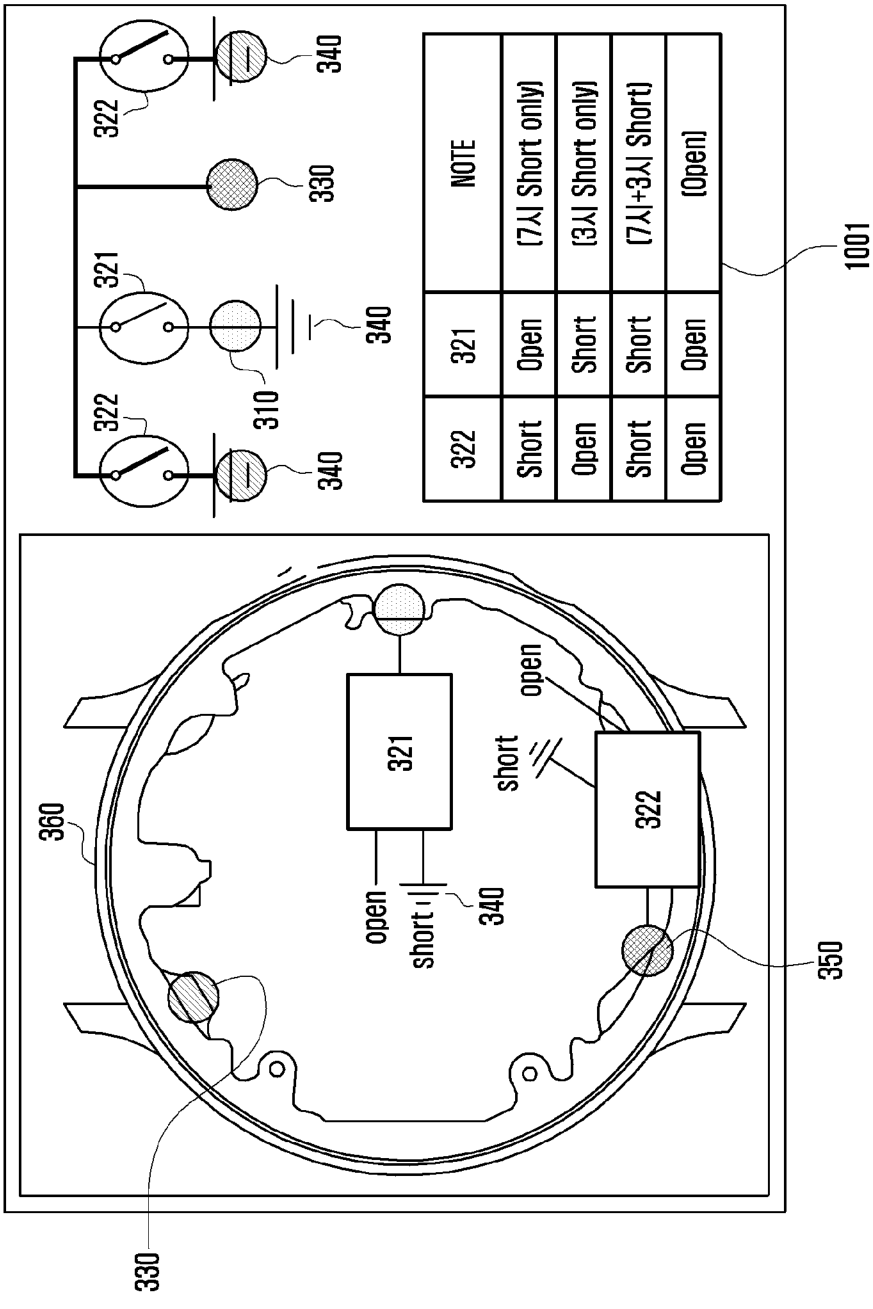
FIG. 10 illustrates, in a diagram and a circuit view, a structure of an electronic device in FIG. 9 according to an embodiment of the disclosure.

FIG. 10 illustrates, in a diagram and a circuit view, a structure of an electronic device in FIG. 9 according to an embodiment of the disclosure.

Referring to FIG. 10, according to various embodiments of the disclosure, the processor 320 may control the first switch 321 and the second switch 322 to change a position in an antenna, at which connection to the feeding unit 330 is made. For example, when the processor 320 opens the first switch 321 and shorts the second switch 322, a position at which connection to the feeding unit 330 is made may vary depending on the position of the short pin 350. Alternatively, when the processor 320 shorts the first switch 321 and opens the second switch 322, a position at which connection to the feeding unit 330 is made may vary depending on the position of the first electronic component 310. Alternatively, when the processor 320 shorts both the first switch 321 and the second switch 322, a position at which connection to the feeding unit 330 is made may be determined between the first electronic component 310 and the short pin 350. Alternatively, when the processor 320 opens both the first switch 321 and the second switch 322, the feeding unit 330 may not be connected to the ground 340. In this case, a loop structure of the antenna may not be formed, and thus the antenna may not radiate a signal. Table 1001 illustrates that results of the operations of the switches are arranged. The processor 320 may control opening/shorting of the first electronic component 310 by adding the first bead 311. Thus, in the case of 1001, at least four different loop paths may be formed through opening/shorting of the first electronic component 310 and opening/shorting of the short pin 350. This may vary depending on the number of electronic components and short pins, and even when there is a limitation in arranging short pins due to a spatial limitation, various loop paths may be formed by using the prearranged electronic components. For example, the processor 320 may control the first switch 321 to be opened and the second switch 322 to be shorted. In this case, an antenna loop may be formed between the feeding unit 330 and the point 901 in FIG. 9. This may correspond to an open/short case in Table 1001 in FIG. 10. Further, the processor 320 may control the first switch 321 to be shorted and the second switch 322 to be opened. This may correspond to a short/open case in Table 1001 in FIG. 10. In this case, an antenna loop may be formed between the feeding unit 330 and the point 902 in FIG. 9. When an antenna loop is formed between the feeding unit 330 and the point 901 in FIG. 9, the length of the antenna loop may include the first length 910. When an antenna loop is formed between the feeding unit 330 and the point 902 in FIG. 9, the length of the antenna loop may include the second length 920 longer than the first length 910. There may be a need to form loops having different lengths depending on the band of the antenna, and the processor 320 may control the first switch 321 and the second switch 322 such that antenna loops having different lengths are formed. Here, the number of switches, the number of formable loops, the number of short pins, and the number of electronic components are not limited, and may vary depending on electronic devices. When the number of short pins and the number of electronic components are increased, the number of formable loops may also be increased. As a result, the formation of various antenna loops may result in the improvement of frequency performance of an antenna.

Figure 11:
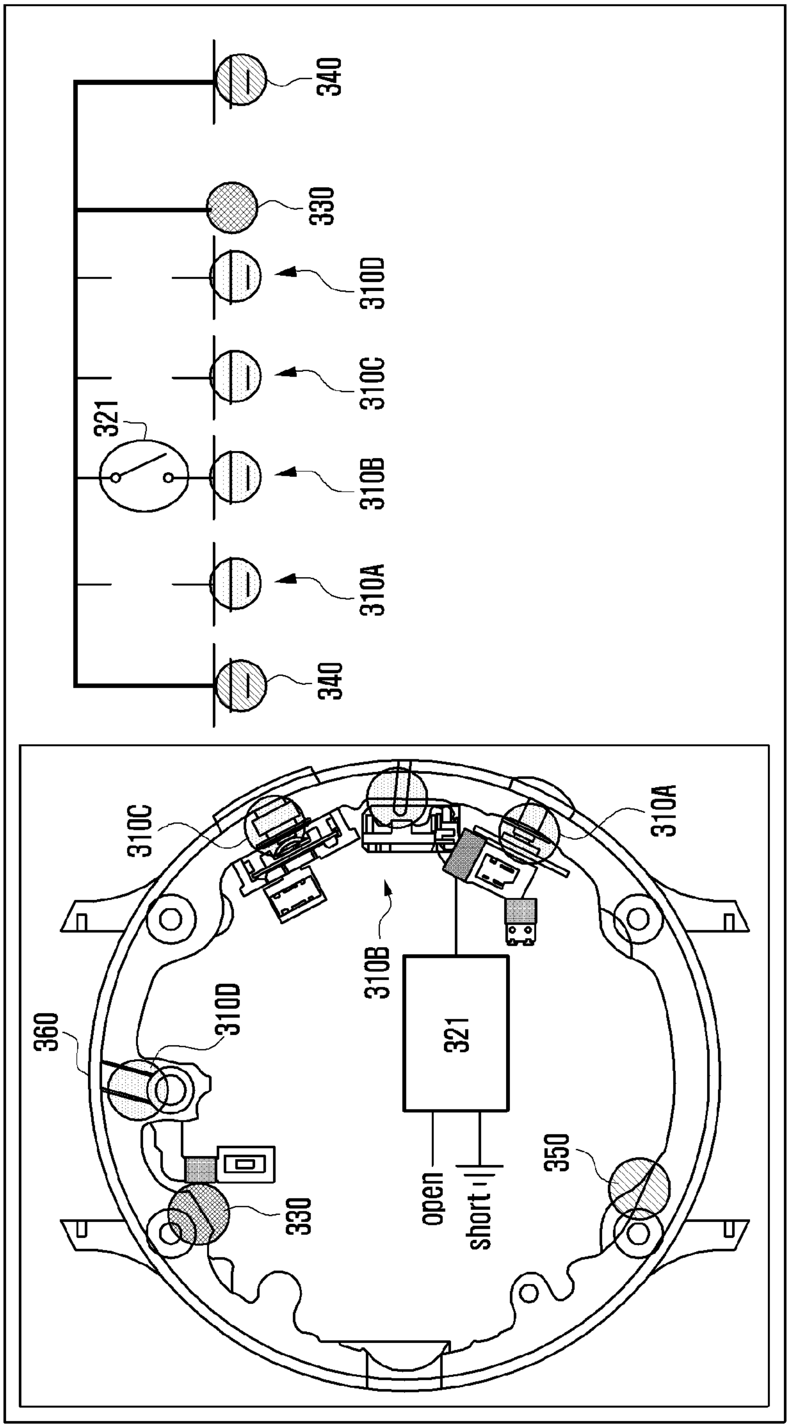
FIG. 11 illustrates multiple electronic components together in a structure of an electronic device in FIG. 10 according to an embodiment of the disclosure.

FIG. 11 illustrates multiple electronic components together in a structure of an electronic device in FIG. 10 according to an embodiment of the disclosure.

According to various embodiments of the disclosure, the electronic device 300 may further include multiple other electronic components in addition to the first electronic component 310.

Referring to FIG. 11, the first switch 321 may be formed between a first electronic component 310B and the feeding unit 330. In FIG. 9, it has been described that the processor 320 may control opening/shorting of the first electronic component 310 through the first switch 321. Referring to a circuit view, it may be identified that a switch is not installed in multiple other electronic components (e.g., one of 310A, 310C, and 310D) other than one electronic component 310B. Switches may be added to the multiple other electronic components (e.g., one of 310A, 310C, and 310D) like one electronic component 310B, thereby variously forming points connected to the feeding unit 330 in the antenna. The inner structure of an electronic component for satisfying the following conditions will be described through FIGS. 12 and 13 below.

Figure 12:
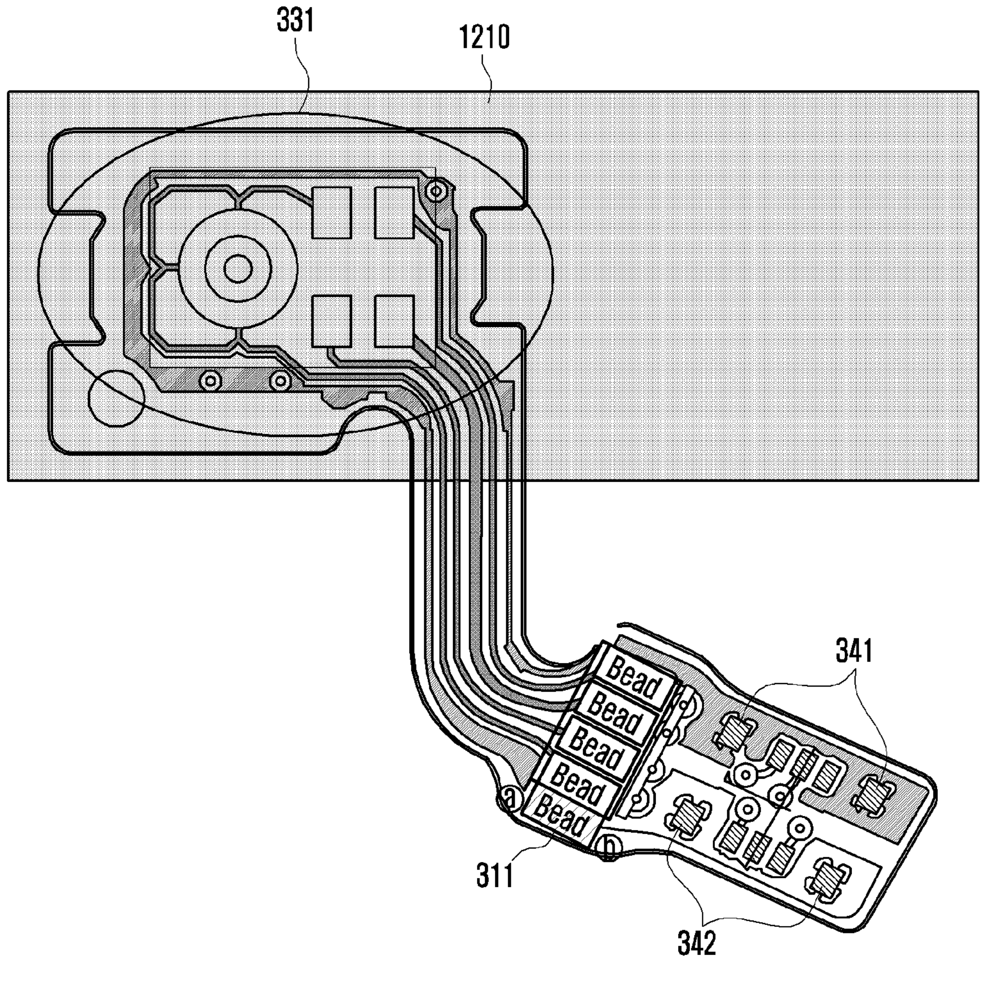
FIG. 12 illustrates an inner structure of an electronic component disposed in an electronic device according to an embodiment of the disclosure.

FIG. 12 illustrates an inner structure of an electronic component disposed in an electronic device according to an embodiment of the disclosure.

Referring to FIG. 12, according to various embodiments of the disclosure, the first electronic component 310 may include a region 1310 which includes a first mounting unit 331, a first ground terminal 341, a second ground terminal 342, and a first bead 311. The first ground terminal 341 and the second ground terminal 342 may be connected to the ground 340. The first switch 321 may be included between the first ground terminal 341, the second ground terminal 342, and the ground 340. The first bead 311 may be positioned between the first ground terminal 341 and the second ground terminal 342. The first bead 311 may be positioned between the second ground terminal 342 and the feeding unit 330. According to FIG. 4 above, the first bead 311 may function as an inductor or a filter in the electronic device 300 or between the second ground terminal 342 and a mounting unit 331 of the first electronic component 310. When an RF signal and a current flowing on a circuit pass through the first bead 311, the RF signal of a high-frequency band may be blocked. However, the first bead 311 may not have an effect on an operation of the first electronic component 310 by allowing a current used for the operation of the first electronic component 310 to pass therethrough. For example, the first bead 311 may play the role of blocking an RF signal of an antenna.

According to various embodiments of the disclosure, the first electronic component 310 may be connected to the ground 340 through the first ground terminal 341 and the second ground terminal 342.

According to various embodiments of the disclosure, the processor 320 may connect the first ground terminal 341 to the ground 340 through the first switch 321. In this case, the first electronic component 310 may form a circuit with the feeding unit 330 to allow a current and an RF signal to flow, and form a loop structure of an antenna. The processor 320 may connect the second ground terminal 342 to the ground 340 through the first switch 321. In this case, the second ground terminal 342 may be connected to the first bead 311. The first bead 311 allows a current to pass therethrough, but may block an RF signal of a high band. The RF signal is blocked, and thus it is difficult to form a loop structure of an antenna. The processor 320 may control whether to allow RF signal to pass, while allowing a current used for the operation of the first electronic component 310 to flow to the first electronic component 310 through the first switch 321.

Figure 13:
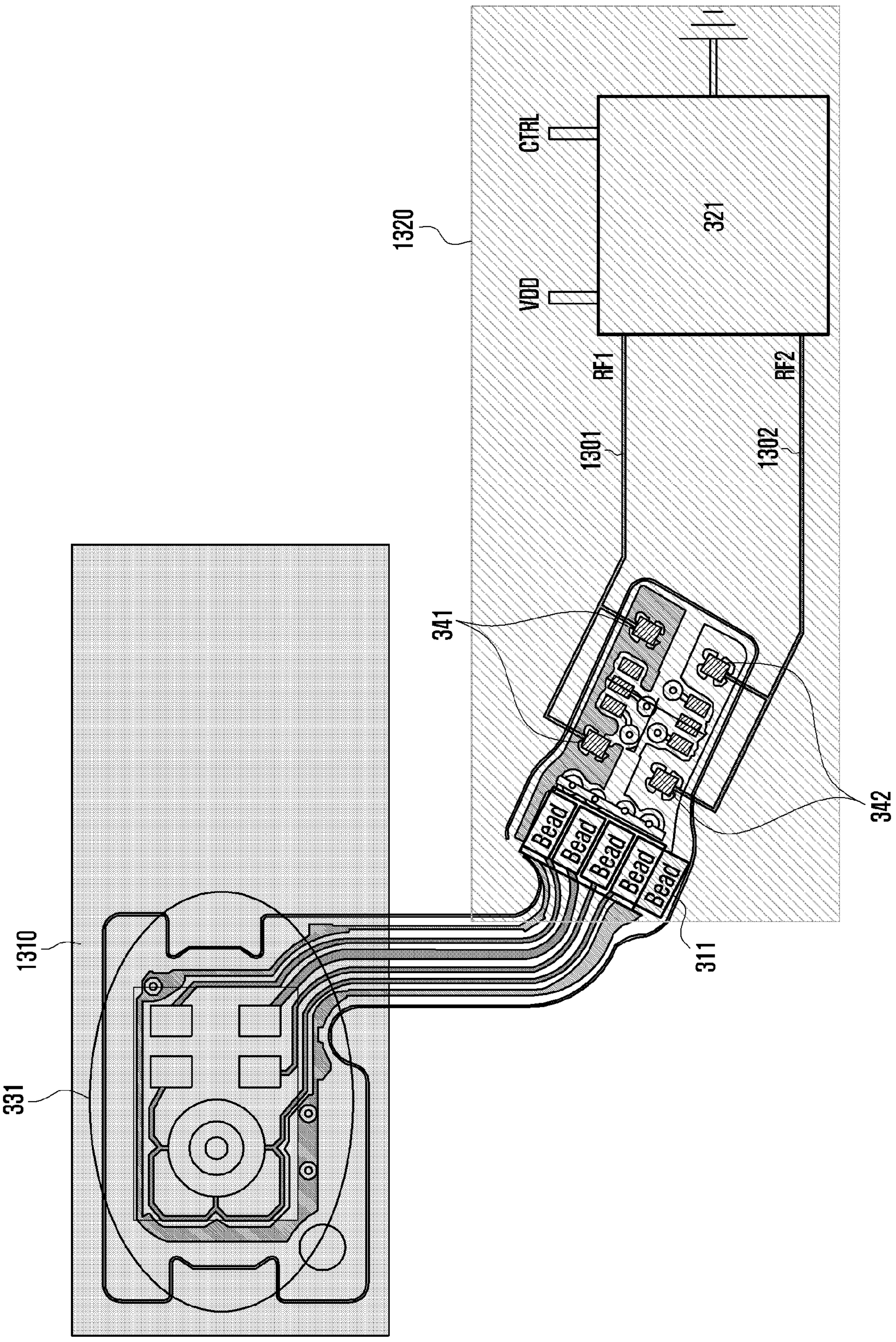
FIG. 13 illustrates an inner structure and circuit of an electronic component disposed in an electronic device according to an embodiment of the disclosure.

FIG. 13 illustrates an inner structure and circuit of an electronic component disposed in an electronic device according to an embodiment of the disclosure.

Referring to FIG. 13, according to various embodiments of the disclosure, the first electronic component 310 may include a region 1310, in which the first mounting unit 331 disposed in an antenna is included, and a region 1320, in which the ground 340 and a circuit are formed. Through the first switch 321, the processor 320 may connect the first ground terminal 341 to the ground 340, or may connect the second ground terminal 342 to the ground 340. For example, when the processor 320 connects the first ground terminal 341 to the ground 340 through the first switch 321, a circuit 1301 by which a current and a signal flow from the feeding unit 330 to the ground 340 through the first mounting unit 331 may be formed. Further, when the processor 320 connects the second ground terminal 342 to the ground 340 through the first switch 321, a circuit 1302 by which a current and a signal flow from the feeding unit 330 to the ground 340 through the first mounting unit 331 may be formed. In FIG. 12 above, it has been described that the first bead 311 may be positioned between the second ground terminal 342 and the first mounting unit 331. A connection point, at which an antenna loop is formed, may be determined by selecting the circuit 1301 or 1302 through the first switch 321, and this process has been described in FIG. 10.

Figure 14:
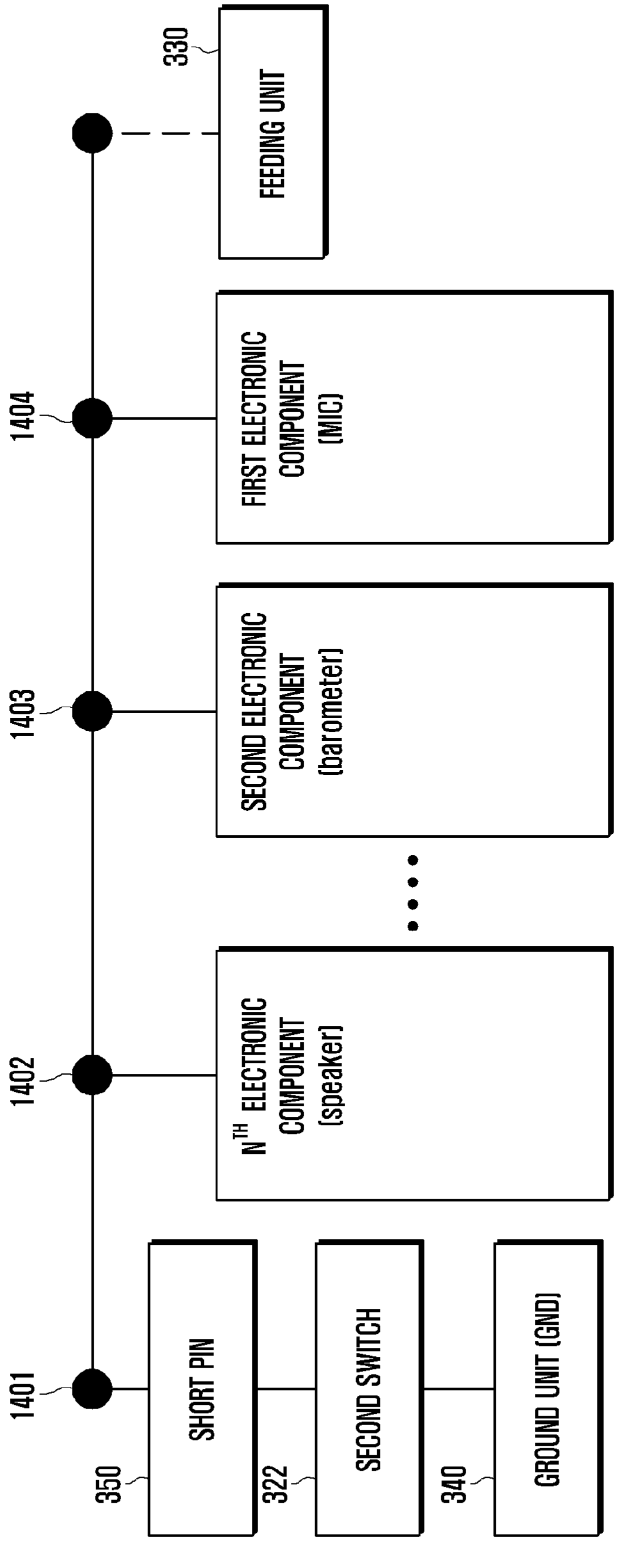
FIG. 14 is a block diagram illustrating a structure of an electronic device according to an embodiment of the disclosure.

FIG. 14 is a block diagram illustrating a structure of an electronic device according to an embodiment of the disclosure.

Referring to FIG. 14, it additionally illustrates multiple electronic components, in addition to the first electronic component 310 in the block diagram of FIG. 9. A process, in which a processor (e.g., the processor 320 in FIG. 3) controls the first switch 321 and the second switch 322 to form a loop structure of an antenna, has been described in FIG. 9. The processor 320 may control separate switches for connecting multiple electronic components to the ground 340. The processor 320 may variously determine, through the separate switches, points 1401 to 1404 at which the loop structure is formed. The points, at which the loop structure is formed, are not limited thereto, and may vary depending on on/off of the separate switches and the number of electronic components. The resonance frequency of an antenna may be variously configured for each band by forming various loop structures. In this case, the performance of an antenna may be improved for each band. Further, the radiation performance of an antenna may be improved in an identical band. This will be described below in FIG. 15.

According to various embodiments of the disclosure, the electronic device 300 may further include a second electronic component. The second electronic component may include the same internal elements as the first electronic component 310 in FIG. 3. The second electronic component may further include a second mounting unit (not shown) disposed near an antenna, a third ground terminal (not shown) and a fourth ground terminal (not shown) for selectively connecting a ground (e.g., the ground 340 in FIG. 3) to the second mounting unit (not shown), a third switch (not shown) positioned at a ground side so as to selectively connect the ground to the third ground terminal (not shown) or the fourth ground terminal (not shown), and a second bead (not shown) positioned between the fourth ground terminal (not shown) and the second mounting unit (not shown).

According to various embodiments of the disclosure, the processor 320 may connect the third switch (not shown) to the third ground terminal (not shown) to perform control such that the second mounting unit (not shown) and the ground 340 is connected to each other without going through the second bead (not shown). Alternatively, the processor 320 may connect the third switch (not shown) to the fourth ground terminal (not shown) to perform control such that the second mounting unit (not shown) is connected to the ground 340 through the second bead (not shown).

According to various embodiments of the disclosure, the processor 320 may connect the first switch 321 to the first ground terminal 341 to perform control such that a current and an RF signal supplied to the first electronic component 310 are electrically connected, or may connect the first switch 321 to the second ground terminal 342 to perform control such that a current supplied to the first electronic component 310 flows but an RF signal is not transmitted. Further, the processor 320 may connect the third switch (not shown) to the third ground terminal (not shown) to perform control such that a current and an RF signal, supplied to the second electronic component, are electrically connected, or may connect the third switch (not shown) to the fourth ground terminal (not shown) to perform control such that a current supplied to the second electronic component flows but an RF signal is not transmitted.

According to various embodiments of the disclosure, an electronic device (e.g., the electronic device 300 in FIG. 3) may include a feeding unit (e.g., the feeding unit 330 in FIG. 3) configured to be provided with a feeding signal from a communication circuit of the electronic device, a first electronic component (e.g., the first electronic component 310 in FIG. 3) disposed in the electronic device, a first mounting unit (e.g., the first mounting unit 331 in FIG. 3) including a portion of the first electronic component, disposed in an antenna, a ground (e.g., the ground 340 in FIG. 3) configured to provide a reference potential to the feeding unit, a first ground terminal and a second ground terminal configured to electrically connect the ground to the first mounting unit, a first bead (e.g., the first bead 311 in FIG. 3) positioned between the second ground terminal and the first mounting unit, and a first switch (e.g., the first switch 321 in FIG. 3) positioned at a side of the ground to electrically connect the ground to at least one of the first ground terminal (e.g., the first ground terminal 341 in FIG. 3) or the second ground terminal (e.g., the second ground terminal 342 in FIG. 3). According to various embodiments of the disclosure, the feeding unit may apply an RF signal by using the first mounting unit disposed in the electronic component.

According to various embodiments of the disclosure, the electronic device may further include a second mounting unit of a second electronic component disposed in the antenna, a third ground terminal and a fourth ground terminal configured to electrically connect the ground to the second mounting unit, a second switch positioned at a side of the ground to selectively electrically connect the ground to the third ground terminal or the fourth ground terminal, and a second bead positioned between the fourth ground terminal and the second mounting unit. At this time, a processor may electrically connect the second switch to the third ground terminal to perform control such that the second mounting unit is electrically connected to the ground without going through the second bead, or may electrically connect the second switch to the fourth ground terminal to perform control such that the second mounting unit is electrically connected to the ground through the second bead.

According to various embodiments of the disclosure, the processor may electrically connect the first switch to the first ground terminal to perform control such that an RF signal is applied through the first electronic component, and may electrically connect the second switch to the fourth ground terminal to perform control such that an RF signal is not applied.

According to various embodiments of the disclosure, the processor may electrically connect the first switch to the second ground terminal to perform control such that an RF signal is not applied through the first electronic component, and may electrically connect the second switch to the third ground terminal to perform control such that an RF signal is applied through the second electronic component.

According to various embodiments of the disclosure, the processor may electrically connect the first switch to the second ground terminal to perform control such that an RF signal is not applied through the first electronic component, and may electrically connect the second switch to the fourth ground terminal to perform control such that an RF signal is not applied through the second electronic component.

According to various embodiments of the disclosure, the processor may electrically connect the first switch to the first ground terminal to perform control such that an RF signal is applied through the first electronic component, and may electrically connect the second switch to the third ground terminal to perform control such that an RF signal is applied through the second electronic component.

According to various embodiments of the disclosure, the first electronic component and the second electronic component may include at least one of a barometer, an ECG/Back key, a MIC, a power key, a speaker, or a UB FPCB.

According to various embodiments of the disclosure, the electronic device may further include a short pin (e.g., the short pin 350 in FIG. 3) positioned in the antenna, and a third switch configured to electrically connect the short pin to the feeding unit, wherein the short pin is positioned in a third direction that is different from a first direction and a second direction of the feeding unit, and the processor may control on/off of the third switch.

According to various embodiments of the disclosure, the processor may electrically connect the first switch to the first ground terminal to perform control such that an RF signal is applied through the first electronic component or electrically connect the first switch to the second ground terminal to perform control such that an RF signal is not applied through the first electronic component, may electrically connect the second switch to the third ground terminal to perform control such that an RF signal is applied through the second electronic component or electrically connect the second switch to the fourth ground terminal to perform control such that an RF signal is not applied through the second electronic component, and may control the third switch (e.g., the switch in FIG. 4) to be opened or shorted.

According to various embodiments of the disclosure, the short pin may be positioned in a second direction different from the first direction of the feeding unit, and the processor may control on/off of the second switch.

According to various embodiments of the disclosure, the processor may electrically connect the first switch to the first ground terminal to perform control such that a current and an RF signal are applied through the first electronic component, and may control the second switch to be opened.

According to various embodiments of the disclosure, the processor may electrically connect the first switch to the second ground terminal to perform control such that an RF signal is not applied, and may control the second switch to be shorted.

According to various embodiments of the disclosure, the processor may electrically connect the first switch to the second ground terminal to perform control such that an RF signal is not applied through the first electronic component, and may control the second switch to be opened.

According to various embodiments of the disclosure, the processor may electrically connect the first switch to the first ground terminal to perform control such that an RF signal is applied through the first electronic component, and may control the second switch to be shorted.

Figure 15:
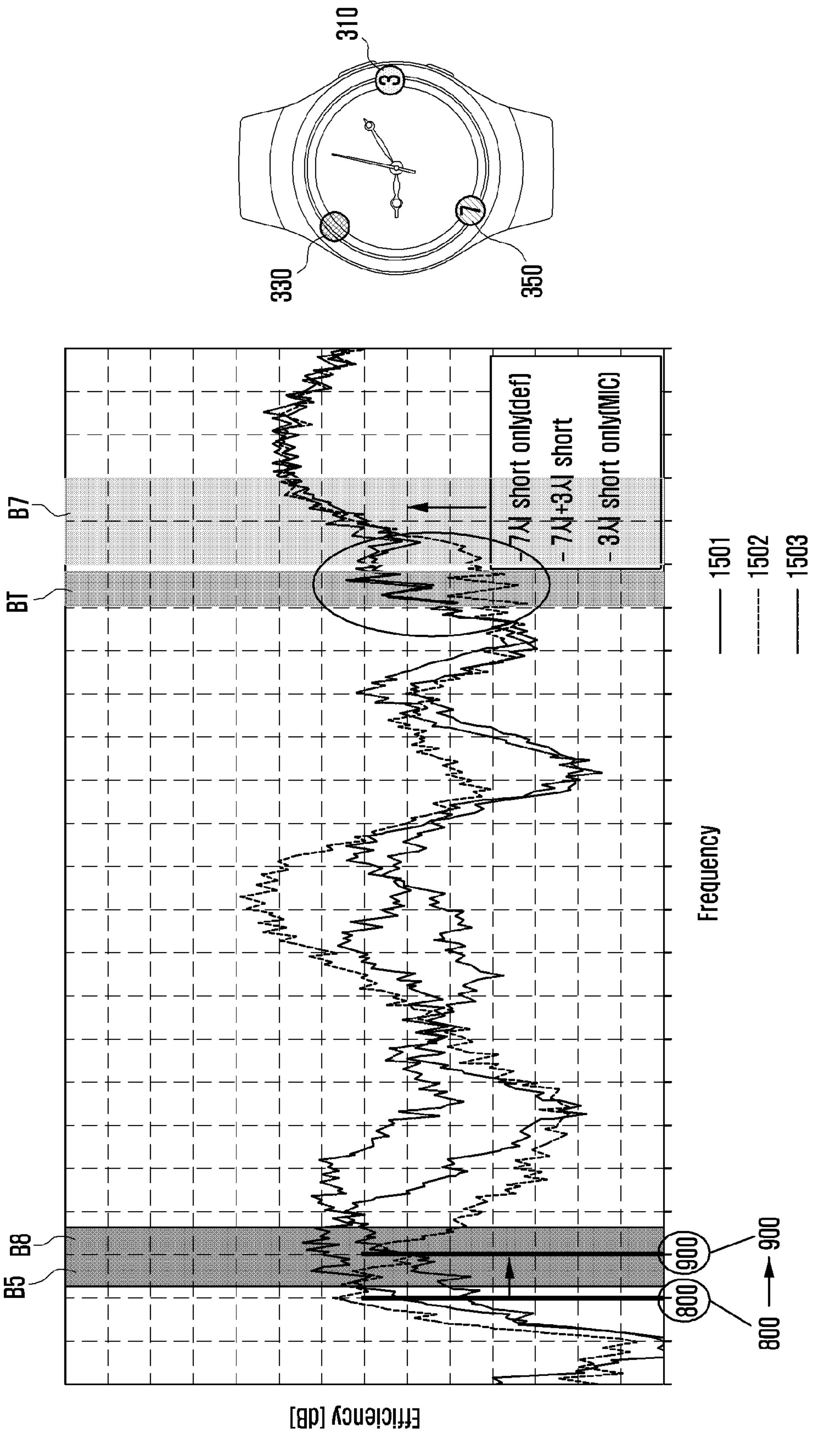
FIG. 15 is a graph illustrating frequency-specific performance of an antenna of an electronic device according to an embodiment of the disclosure.

FIG. 15 is a graph illustrating frequency-specific performance of an antenna of an electronic device according to an embodiment of the disclosure.

Referring to FIG. 15, the x-axis in the graph may indicate the frequency of an antenna. The y-axis may indicate the performance of the antenna according to the frequency. It may be understood that the higher the value of the y-axis is, the better the antenna performance in a corresponding frequency domain is. The frequency domain of the antenna may include domains B5 and B8, which are relatively low bands, and domains BT and B7, which are relatively high bands. Line 1501 may indicate the case in which a loop is formed through the first electronic component 310 by shorting the first switch 321 (for example, connecting the first ground terminal 341 to the ground 340) and opening the second switch 322. Line 1502 may indicate the case in which a loop is formed through the short pin 350 by opening the first switch 321 (for example, connecting the second ground terminal 342 to the ground 340) and shorting the second switch 322. Line 1503 may indicate the case in which a loop is formed through a point between the first electronic component 310 and the short pin 350 by shorting the first switch 321 and shoring the second switch 322.

When looking at domains B5 and B8 which are low-band frequency domains, it may be identified that, in line 1502, the highest point is formed at about 800 MHz, but, in line 1501, the highest point is formed at about 900 MHz. Here, the highest point may include a point at which the performance of a band is maximized within domains B5 and B8. For example, when the frequency band is 800 MHz, the processor 320 may open the first switch 321 and short the second switch 322, thereby maximally improving the performance of the antenna. When the frequency band is 900 MHz, the processor 320 may short the first switch 321 and open the second switch 322, thereby maximally improving the performance of the antenna. The processor 320 may also adjust a switch on the same principle in other bands, thereby maximally improving the performance of the antenna.

When looking at domain BT which is a high-band frequency domain of the antenna, it may be identified that line 1501, in which an antenna loop is formed through the first electronic component 310, is positioned higher on the graph than line 1502, in which an antenna loop is formed through the short pin 350. It may be found that the higher the line is positioned on the graph, the more improved the performance of the antenna is. Even in the same frequency band, using the first electronic component 310 as a type of short pin 350 may improve the band-specific performance of the antenna compared with using only the short pin 350.

According to various embodiments of the disclosure, in a method for improving the performance of an antenna of an electronic device, the electronic device (e.g., the electronic device 300 in FIG. 3) may include a feeding unit (e.g., the feeding unit 330 in FIG. 3) configured to be provided with a feeding signal from a communication circuit of the electronic device, a first electronic component (e.g., the first electronic component 310 in FIG. 3) disposed in the electronic device, a first mounting unit (e.g., the first mounting unit 331 in FIG. 3) including a portion of the first electronic component, disposed in the antenna, a ground (e.g., the ground 340 in FIG. 3) configured to provide a reference potential to the feeding unit, a first ground terminal and a second ground terminal configured to electrically connect the ground to the first mounting unit, a first bead (e.g., the first bead 311 in FIG. 3) positioned between the second ground terminal and the first mounting unit, and a first switch (e.g., the first switch 321 in FIG. 3) positioned at a side of the ground to electrically connect the ground to at least one of the first ground terminal (e.g., the first ground terminal 341 in FIG. 3) or the second ground terminal (e.g., the second ground terminal 342 in FIG. 3). The method for improving the performance of the antenna of the electronic device may include an operation of electrically connect the first switch to the first ground terminal to perform control such that the first mounting unit is electrically connected to the ground without going through the first bead, or an operation of electrically connecting the first switch to the second ground terminal to perform control such that the first mounting unit is electrically connected to the ground through the first bead.

According to various embodiments of the disclosure, the electronic device may further include a second mounting unit of a second electronic component disposed in the antenna, a third ground terminal and a fourth ground terminal configured to electrically connect the ground to the second mounting unit, a second switch positioned at a side of the ground to selectively electrically connect the ground to the third ground terminal or the fourth ground terminal, and a second bead positioned between the fourth ground terminal and the second mounting unit. At this time, the method of improving the performance of the antenna of the electronic device may further include an operation of electrically connecting the second switch to the third ground terminal to perform control such that the second mounting unit is electrically connected to the ground without going through the second bead, or an operation of electrically connecting the second switch to the fourth ground terminal to perform control such that the second mounting unit is electrically connected to the ground through the second bead.

According to various embodiments of the disclosure, the electronic device may further include a short pin (e.g., the short pin 350 in FIG. 3) positioned on a flexible printed circuit board (FPCB) of the antenna, and a second switch configured to electrically connect the short pin to the feeding unit. At this time, the method of improving the performance of the antenna of the electronic device may further include an operation of connecting the first switch to the first ground terminal to perform control such that an RF signal is applied through the first electronic component and opening the second switch, or an operation of connecting the first switch to the second ground terminal to perform control such that an RF signal is not applied through the first electronic component and shorting the second switch.

According to various embodiments of the disclosure, the electronic device may further include a short pin and a third switch configured to electrically connect the short pin to the feeding unit. The method of improving the performance of the antenna of the electronic device may further include an operation of connecting the first switch to the first ground terminal to perform control such that an RF signal is applied through the first electronic component, or connecting the first switch to the second ground terminal to perform control such that an RF signal is not applied through the first electronic component, an operation of connecting the second switch to the third ground terminal to perform control such that an RF signal is applied through the second electronic component or connecting the second switch to the fourth ground terminal to perform control such that an RF signal is not applied through the second electronic component, and an operation of opening the third switch to electrically disconnect the feeding unit from the short pin or shorting the third switch to electrically connect the feeding unit to the short pin.

According to various embodiments of the disclosure, the first electronic component and the second electronic component may include at least one of a barometer, an ECG/Back key, a MIC, a power key, a speaker, or a UB FPCB.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a feeding unit configured to be provided with a feeding signal from a communication circuit of the electronic device;

an antenna electrically connected to the feeding unit;

a first electronic component disposed in the electronic device;

a first mounting unit positioned in a first direction of the feeding unit and comprising a portion of the first electronic component, disposed near the antenna;

a ground;

a first ground terminal and a second ground terminal, positioned on the first electronic component and included in a circuit configured to electrically connect the ground to the first electronic component;

a first bead positioned between the second ground terminal and the first mounting unit;

a first switch positioned at a side of the ground to electrically connect the ground to the first ground terminal or electrically connect the ground to the second ground terminal; and at least one processor configured to control an operation of the first switch, wherein the at least one processor is configured to:

electrically connect the first switch to the first ground terminal such that the first mounting unit is electrically connected to the ground without going through the first bead, or electrically connect the first switch to the second ground terminal such that the first mounting unit is electrically connected to the ground through the first bead, and wherein the feeding unit is configured to apply a radio-frequency (RF) signal by using the first mounting unit disposed in the antenna.

2. The electronic device of claim 1, further comprising:

a second mounting unit of a second electronic component disposed in the antenna;

a third ground terminal and a fourth ground terminal configured to electrically connect the ground to the second mounting unit;

a second switch positioned at a side of the ground to electrically connect the ground to at least one of the third ground terminal or the fourth ground terminal; and a second bead positioned between the fourth ground terminal and the second mounting unit, wherein the second mounting unit is positioned in a second direction different from the first direction, and wherein the at least one processor is further configured to:

electrically connect the second switch to the third ground terminal to perform control such that the second mounting unit is electrically connected to the ground without going through the second bead, or electrically connect the second switch to the fourth ground terminal to perform control such that the second mounting unit is electrically connected to the ground through the second bead.

3. The electronic device of claim 2, wherein the at least one processor is further configured to:

electrically connect the first switch to the first ground terminal to perform control such that the RF signal is applied through the first electronic component, and electrically connect the second switch to the fourth ground terminal to perform control such that the RF signal is not applied through the second electronic component.

4. The electronic device of claim 2, wherein the at least one processor is further configured to:

electrically connect the first switch to the second ground terminal to perform control such that the RF signal is not applied through the first electronic component, and electrically connect the second switch to the third ground terminal to perform control such that the RF signal is applied through the second electronic component.

5. The electronic device of claim 2 wherein the at least one processor is further configured to:

electrically connect the first switch to the second ground terminal to perform control such that the RF signal is not transmitted through the first electronic component, and electrically connect the second switch to the fourth ground terminal to perform control such that the RF signal is not transmitted through the second electronic component.

6. The electronic device of claim 2, wherein the at least one processor is further configured to:

electrically connect the first switch to the first ground terminal to perform control such that the RF signal is applied through the first electronic component, and electrically connect the second switch to the third ground terminal to perform control such that the RF signal is applied through the second electronic component.

7. The electronic device of claim 2, wherein the first electronic component and the second electronic component comprise at least one of a barometer, an electrocardiogram (ECG)/Back key, a microphone (MIC), a power key, a speaker, or a universal bus (UB) flexible printed circuit board (FPCB).

8. The electronic device of claim 2, further comprising:

a short pin disposed in the electronic device; and a third switch configured to electrically connect the short pin to the feeding unit, wherein the short pin is positioned in a third direction that is different from the first direction and the second direction of the feeding unit, and wherein the at least one processor is further configured to control on/off of the third switch.

9. The electronic device of claim 8, wherein the at least one processor is further configured to:

electrically connect the first switch to the first ground terminal to perform control such that the RF signal is applied through the first electronic component or electrically connect the first switch to the second ground terminal to perform control such that the RF signal is not applied through the first electronic component, electrically connect the second switch to the third ground terminal to perform control such that the RF signal is applied through the second electronic component or electrically connect the second switch to the fourth ground terminal to perform control such that the RF signal is not applied through the second electronic component, and control the third switch to be opened or shorted.

10. The electronic device of claim 1, further comprising:

a short pin disposed in the electronic device; and a second switch configured to electrically connect the short pin to the feeding unit, wherein the short pin is positioned in a second direction different from the first direction of the feeding unit, and wherein the at least one processor is further configured to control on/off of the second switch.

11. The electronic device of claim 10, wherein the at least one processor is further configured to:

electrically connect the first switch to the first ground terminal to perform control such that the RF signal is transmitted through the first electronic component, and control the second switch to be opened.

12. The electronic device of claim 10, wherein the at least one processor is further configured to:

electrically connect the first switch to the second ground terminal to perform control such that the RF signal is not transmitted through the first electronic component, and control the second switch to be shorted.

13. The electronic device of claim 10, wherein the at least one processor is further configured to:

electrically connect the first switch to the second ground terminal to perform control such that the RF signal is not transmitted through the first electronic component, and control the second switch to be opened.

14. The electronic device of claim 10, wherein the at least one processor is further configured to:

electrically connect the first switch to the first ground terminal to perform control such that the RF signal is applied through the first electronic component, and control the second switch to be shorted.

15. A method for improving performance of an antenna of an electronic device, the method comprising:

electrically connecting, by the electronic device, a first switch to a first ground terminal to perform control such that a first mounting unit is electrically connected to a ground without going through a first bead, or electrically connecting, by the electronic device, the first switch to a second ground terminal to perform control such that the first mounting unit is electrically connected to the ground through the first bead, wherein the first mounting unit is positioned in a first direction of a feeding unit and comprising a portion of a first electronic component, disposed near the antenna, wherein a ground is configured to provide a reference potential to the feeding unit, wherein the first ground terminal and the second ground terminal are configured to electrically connect the ground to the first mounting unit, wherein the first bead is positioned between the second ground terminal and the first mounting unit, wherein the first switch is positioned at a side of the ground to electrically connect the ground to the first ground terminal or electrically connect the ground to the second ground terminal, and wherein the feeding unit is configured to apply a radio-frequency (RF) signal by using the first mounting unit disposed in the antenna.

16. The method of claim 15, further comprising:

electrically connecting a second switch to a third ground terminal to perform control such that a second mounting unit is electrically connected to the ground without going through a second bead, or electrically connecting the second switch to a fourth ground terminal to perform control such that the second mounting unit is electrically connected to the ground through the second bead, wherein the second mounting unit comprises a portion of a second electronic component, disposed near the antenna, wherein the third ground terminal and the fourth ground terminal are configured to electrically connect the ground to the second mounting unit, wherein the second switch is positioned at a side of the ground to electrically connect the ground to the third ground terminal or electrically connect the ground to the fourth ground terminal, and wherein the second bead is positioned between the fourth ground terminal and the second mounting unit.

17. The method of claim 16, further comprising:

connecting the first switch to the first ground terminal to perform control such that a radio frequency (RF) signal is applied through the first electronic component, or connecting the first switch to the second ground terminal to perform control such that the RF signal is not applied through the first electronic component, connecting the second switch to the third ground terminal to perform control such that the RF signal is applied through the second electronic component, or connecting the second switch to the fourth ground terminal to perform control such that the RF signal is not applied through the second electronic component, and opening a third switch to electrically disconnect the feeding unit from a short pin or shorting the third switch to electrically connect the feeding unit to the short pin, wherein the short pin is disposed in the electronic device, and wherein the third switch is configured to electrically connect the short pin to the feeding unit.

18. The method of claim 16, wherein the first electronic component and the second electronic component comprise at least one among of a barometer, an electrocardiogram (ECG)/Back key, a microphone (MIC), a power key, a speaker, and or a universal bus (UB) flexible printed circuit board (FPCB).

19. The method of claim 16, further comprising:

connecting the first switch to the first ground terminal to perform control such that the RF signal is applied through the first electronic component and opening the second switch, or connecting the first switch to the second ground terminal to perform control such that the RF signal is not applied through the first electronic component and shorting the second switch, wherein a short pin is disposed in the electronic device, and wherein a second switch is configured to electrically connect the short pin to the feeding unit.

* * * * *